US012643332B2

(12) United States Patent
Yanagihara

(10) Patent No.: US 12,643,332 B2
(45) **Date of Patent: *Jun. 2, 2026**

(54) LIQUID EJECTING APPARATUS AND CLEANING METHOD FOR LIQUID EJECTING HEAD

(71) Applicant: SEIKO EPSON CORPORATION, Tokyo (JP)

(72) Inventor: Hirokazu Yanagihara, Chino (JP)

(73) Assignee: SEIKO EPSON CORPORATION (JP)

( * ) Notice: Subject to any disclaimer, the term of this patent is extended or adjusted under 35 U.S.C. 154(b) by 121 days.

This patent is subject to a terminal disclaimer.

(21) Appl. No.: 18/783,571

(22) Filed: Jul. 25, 2024

(65) Prior Publication Data

US 2025/0033373 A1 Jan. 30, 2025

(30) Foreign Application Priority Data

Jul. 26, 2023 (JP) ................................ 2023-121470

(51) Int. Cl.
*B41J 2/18* (2006.01)
*B41J 2/165* (2006.01)
*B41J 2/175* (2006.01)
*B41J 2/19* (2006.01)

(52) U.S. Cl.
CPC ............ *B41J 2/18* (2013.01); *B41J 2/16502* (2024.05); *B41J 2/17563* (2013.01); *B41J 2/19* (2013.01); *B41J 2202/07* (2013.01)

(58) Field of Classification Search
CPC ........................................................ B41J 2/18
USPC ........................................................ 347/92
See application file for complete search history.

(56) References Cited

U.S. PATENT DOCUMENTS 9,895,897 B2 2/2018 Miravet Jimenez et al.
9,925,803 B2 3/2018 Hori et al.
2011/0242235 A1 10/2011 Kitamura
2020/0269591 A1 * 8/2020 Hamamoto .............. B41J 29/13
(Continued)

FOREIGN PATENT DOCUMENTS

EP 3466698 A1 4/2019
JP 2009-023289 A 2/2009
JP 2009-184264 A 8/2009
(Continued)

*Primary Examiner* — Douglas X Rodriguez
*Assistant Examiner* — Rami A Alshoroogi
(74) *Attorney, Agent, or Firm* — Harness, Dickey & Pierce, P.L.C.

(57) ABSTRACT

A liquid ejecting apparatus includes one or more liquid ejecting heads each including a filter provided in a middle of a flow path through which liquid is supplied to nozzles, a liquid storage portion storing the liquid to be supplied to the liquid ejecting head, a circulation mechanism circulating the liquid between the liquid ejecting head and the liquid storage portion, and a controller controlling the circulation mechanism. The one or more liquid ejecting heads include a first liquid ejecting head including a first filter, and the controller performs, with respect to the first liquid ejecting head, a first circulation cleaning process in which a first circulation operation of circulating the liquid at a first flow rate is performed and then a second circulation operation of circulating the liquid at a second flow rate higher than the first flow rate is performed.

16 Claims, 15 Drawing Sheets

(56) References Cited

U.S. PATENT DOCUMENTS

| | | | |
|---|---|---|---|
| 2021/0394521 | A1 | 12/2021 | Watanabe |

FOREIGN PATENT DOCUMENTS

| | | | |
|---|---|---|---|
| JP | 2021-194881 | A | 12/2021 |
| WO | 2018-225333 | A1 | 12/2018 |

* cited by examiner

FIG. 21

T1

| DISPOSITION ANGLE $\theta$ [deg] | FIRST FLOW RATE [g/sec] | SECOND FLOW RATE [g/sec] | |
|---|---|---|---|
| 0 | 1.2 | 1.5 | 160_1 |
| 15 | 1.15 | 1.55 | 160_2 |
| 30 | 1.1 | 1.6 | 160_3 |
| 45 | 1.0 | 1.7 | 160_4 |
| 60 | 0 | 2.0 | 160_5 |
| 75 | 0 | 1.5 | 160_6 |
| 90 | 0 | 1.5 | 160_7 |

LIQUID EJECTING APPARATUS AND CLEANING METHOD FOR LIQUID EJECTING HEAD

The present application is based on, and claims priority from JP Application Serial Number 2023-121470, filed Jul. 26, 2023, the disclosure of which is hereby incorporated by reference herein in its entirety.

BACKGROUND

1. Technical Field

The present disclosure relates to a liquid ejecting apparatus and a cleaning method for a liquid ejecting head.

2. Related Art

Disclosed in JP-A-2021-194881 is a liquid ejecting apparatus that includes a liquid ejecting head, in which a filter for the filtering of liquid is provided in the middle of a flow path through which the liquid is supplied to a plurality of nozzles for ejection of the liquid, and a liquid storage portion in which liquid to be supplied to the liquid ejecting head is stored.

In the liquid ejecting apparatus, the liquid is circulated between the liquid ejecting head and the liquid storage portion so that air bubbles in the flow path of the liquid ejecting head are discharged to the outside of the liquid ejecting head.

However, in the related art, even when the liquid is circulated between the liquid ejecting head and the liquid storage portion, air bubbles in an upstream chamber, which is disposed upstream of the filter in a filter chamber in which the filter is disposed, may stay in the upstream chamber.

SUMMARY

According to an aspect of the present disclosure, there is provided a liquid ejecting apparatus including one or more liquid ejecting heads each including a filter provided in a middle of a flow path through which liquid is supplied to a plurality of nozzles for ejection of the liquid, a liquid storage portion storing the liquid to be supplied to the liquid ejecting head, a circulation mechanism circulating the liquid between the liquid ejecting head and the liquid storage portion, and a controller controlling the circulation mechanism. The one or more liquid ejecting heads include a first liquid ejecting head including a first filter as the filter, and the controller performs, with respect to the first liquid ejecting head, a first circulation cleaning process in which a first circulation operation of circulating the liquid at a first flow rate is performed and then a second circulation operation of circulating the liquid at a second flow rate higher than the first flow rate is performed.

In addition, according to another aspect of the present disclosure, there is provided a cleaning method for a first liquid ejecting head including a first filter provided in a middle of a flow path through which liquid is supplied to a plurality of nozzles for ejection of the liquid supplied from a first liquid storage portion, the method including performing, with respect to the first liquid ejecting head, a first circulation cleaning process in which a first circulation operation of circulating the liquid between the first liquid ejecting head and the first liquid storage portion at a first flow rate is performed and then a second circulation operation of circulating the liquid at a second flow rate higher than the first flow rate is performed.

BRIEF DESCRIPTION OF THE DRAWINGS

FIG. 21 is a diagram showing examples of a first flow rate of ink circulated in the first circulation cleaning operation and a second flow rate of ink circulated in the second circulation cleaning operation.

DESCRIPTION OF EMBODIMENTS

Hereinafter, embodiments of the present disclosure will be described with reference to the drawings. Note that, the dimensions and scales of each part shown in each drawing are different from the actual dimensions and scales as appropriate. In addition, since the embodiments to be described below are suitable specific examples of the present disclosure, various technically-preferable limitations are provided to the embodiments. However, the range of the present disclosure is not limited to the embodiments unless there is no description to the effect that the present disclosure is limited hereinafter.

The following description will be made while using, as appropriate, an x-axis, a y-axis, and a z-axis that intersect each other. In addition, one direction along the x-axis will be referred to as an x1 direction, and a direction opposite to the x1 direction will be referred to as an x2 direction. Similarly, opposite directions that extend along the y-axis will be referred to as a y1 direction and a y2 direction. In addition, opposite directions that extend along the z-axis will be referred to as a z1 direction and a z2 direction. An xyz coordinate system with the x-axis, the y-axis, and the z-axis is a coordinate system fixed to a liquid ejecting apparatus. The orientation of the xyz coordinate system is determined such that the z2 direction is the gravity direction and the z-axis is parallel to the gravity direction.

1: First Embodiment

1-1: Schematic Configuration of Liquid Ejecting Apparatus

Figure 1:
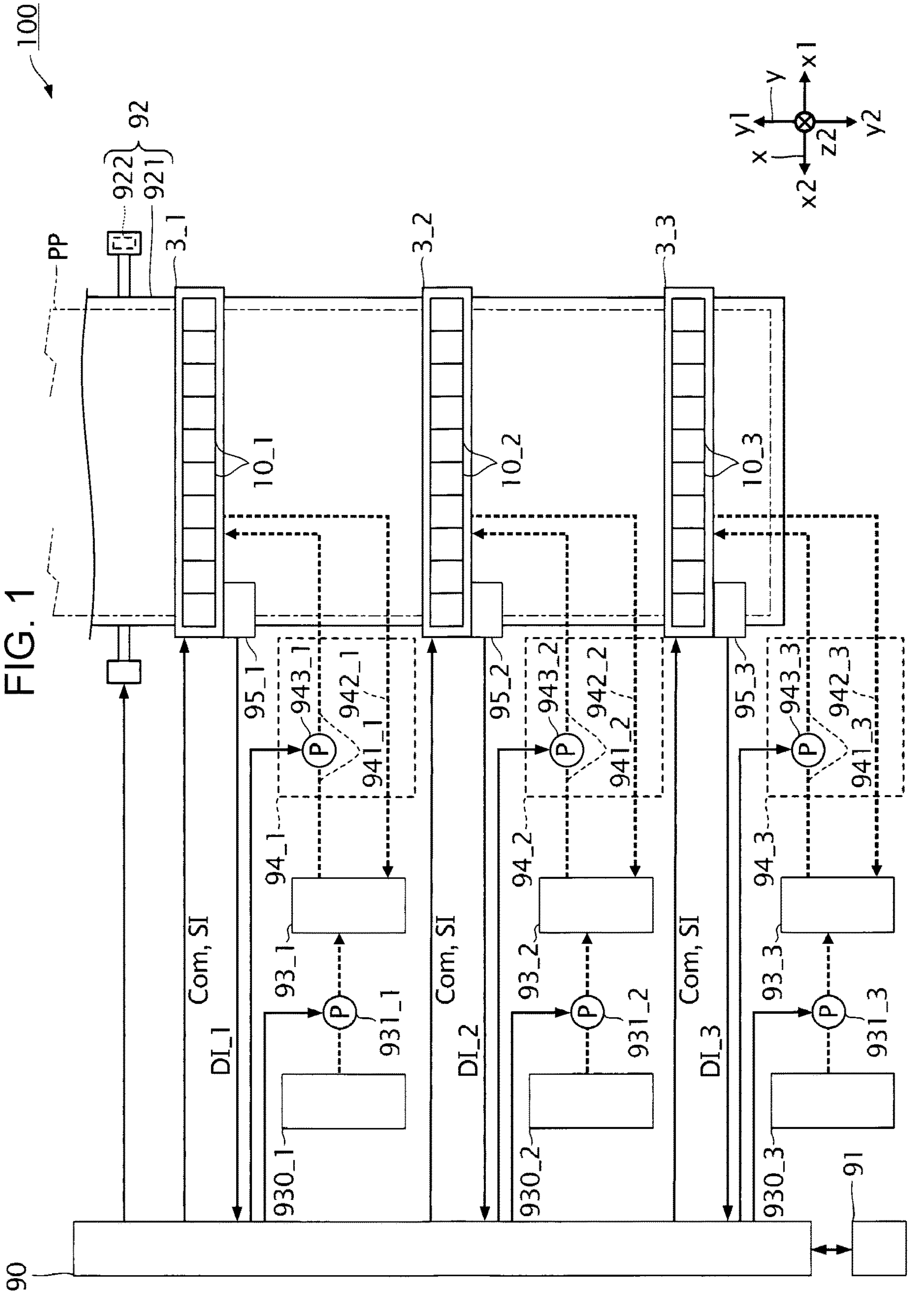
FIG. 1 is a schematic view showing a configuration example of a liquid ejecting apparatus according to a first embodiment.

FIG. 1 is a schematic view showing a configuration example of a liquid ejecting apparatus 100 according to a first embodiment. The liquid ejecting apparatus 100 is an ink jet printing apparatus that ejects ink, which is an example of "liquid", onto a medium PP in the form of droplets. The liquid ejecting apparatus 100 of the present embodiment is a so-called line-type printing apparatus in which a plurality of nozzles for ejection of ink are distributed over the entire medium PP in a width direction. The medium PP is, typically, printing paper. Note that, the medium PP is not limited to printing paper and may be a printing target formed of any material such as a resin film or cloth.

As shown in FIG. 1, the liquid ejecting apparatus 100 is equipped with a plurality of liquid supply sources 930 that store ink. The liquid supply sources 930 function as main tanks. Specific examples of the liquid supply sources 930 include a cartridge detachable from the liquid ejecting apparatus 100, a bag-shaped ink pack formed of a flexible film, and an ink tank refillable with ink. Note that, any type of ink is stored in the liquid supply sources 930.

Although not shown in the drawings, the liquid supply source 930 of the present embodiment includes a first liquid container and a second liquid container. Ink to be supplied to heads 10 which will be described later is stored in storage portions 93. The storage portions 93 are examples of a "liquid storage portion". Pumps 931 are provided between the plurality of liquid supply sources 930 and a plurality of the storage portions 93, respectively. First ink is stored in the first liquid container. Second ink, which is a different type of ink from the first ink, is stored in the second liquid container. For example, the first ink and the second ink are inks of which the colors are different from each other. The first ink and the second ink may be the same type of ink. The composition of ink is not particularly limited, and may be the composition of any of, for example, a water-based ink in which a coloring material such as a dye or a pigment is dissolved in a water-based solvent, a UV-curable ink, or a solvent-based ink.

The liquid ejecting apparatus 100 includes a controller 90, a storage section 91, a transport mechanism 92, a plurality of head modules 3, a plurality of circulation mechanisms 94, and a plurality of angular sensors 95 in addition to the plurality of liquid supply sources 930, the plurality of pumps 931, and the plurality of storage portions 93. In the first embodiment, the liquid ejecting apparatus 100 includes the storage portions 93, the circulation mechanisms 94, and the angular sensors 95 that correspond to three head modules 3, respectively. Specifically, the liquid ejecting apparatus 100 includes head modules 3_1 to 3_3, liquid supply sources 930_1 to 930_3, a plurality of pumps 931_1 to 931_3, storage portions 93_1 to 93_3, circulation mechanisms 94_1 to 94_3, and angular sensors 95_1 to 95_3. However, the number of head modules 3 included in the liquid ejecting apparatus 100 is not limited to three and may be two or four or more. Hereinafter, description will be made on the assumption that the number of head modules 3 included in the liquid ejecting apparatus 100 is three. In addition, the head 10 included in the head module 3_1 will be referred to as a head 10_1. The head 10 included in the head module 3_2 will be referred to as a head 10_2. The head 10 included in the head module 3_3 will be referred to as a head 10_3. The "head 10" is a term collectively referring to the head 10_1, the head 10_2, and the head 10_3.

The storage section 91 is composed of a magnetic storage device, a flash ROM, or the like. "ROM" is an abbreviation for "Read Only Memory". The storage section 91 stores various programs and various data.

The controller 90 controls the operation of each element of the liquid ejecting apparatus 100. The controller 90 is, for example, a processing circuit such as a CPU or an FPGA. "CPU" is an abbreviation for "Central Processing Unit". "FPGA" is an abbreviation for "Field Programmable Gate Array". The controller 90 may be a multiprocessor including a plurality of processors. The controller 90 reads a program from the storage section 91, executes the program, and realizes various types of control by appropriately using data stored in the storage section 91. The controller 90 outputs a drive signal Com and a control signal SI toward the heads 10. The drive signal Com is a signal including a drive pulse for the driving of drive elements Ea and Eb of the heads 10. The control signal SI is a signal that designates whether or not to supply the drive signal Com to the drive elements Ea and Eb.

Figure 2:
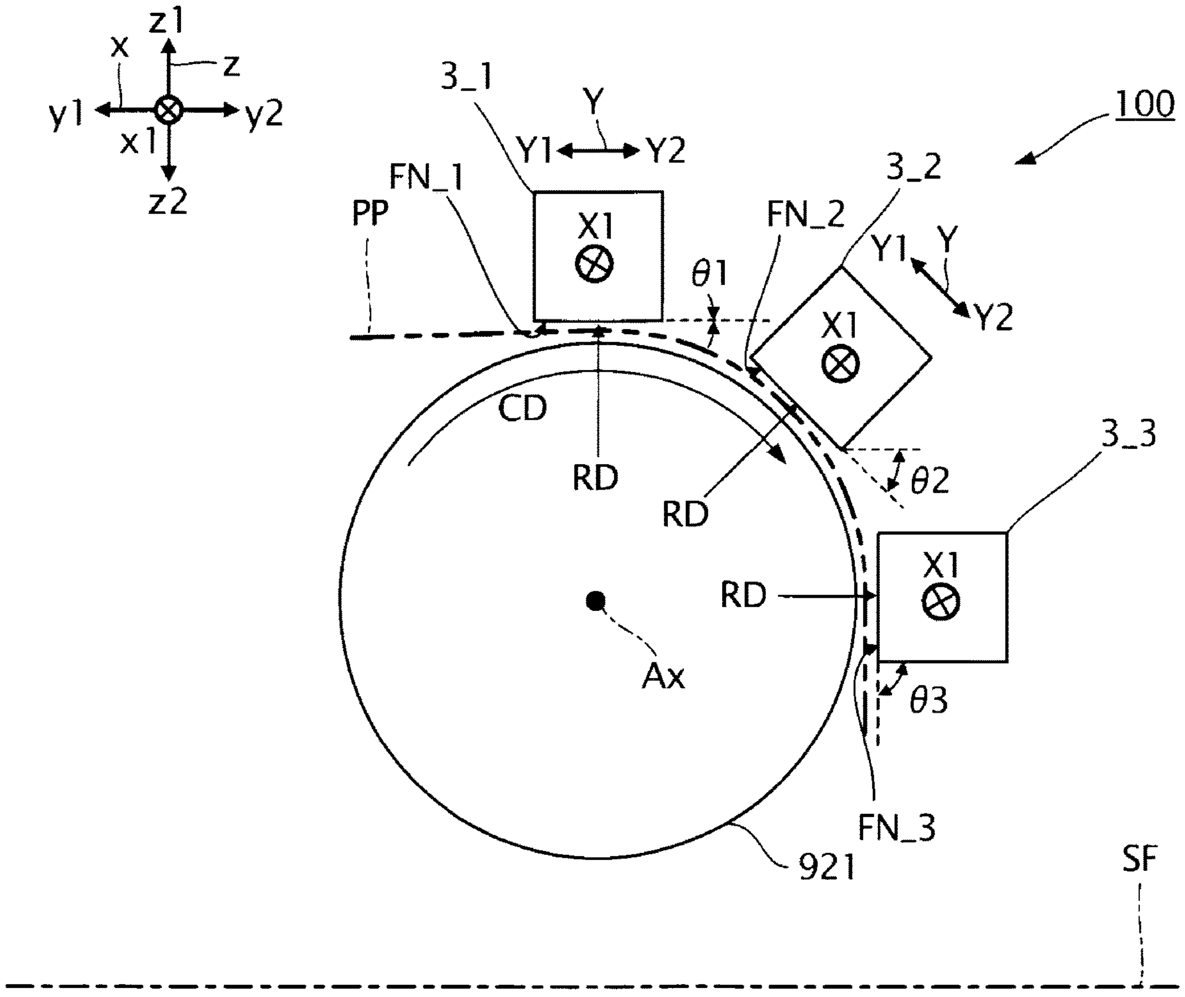
FIG. 2 is a view of the liquid ejecting apparatus as seen in an x1 direction.

The transport mechanism 92 transports the medium PP. The transport mechanism 92 includes a drum 921 that transports the medium PP in a state where the medium PP is adsorbed on an outer peripheral surface of the drum 921 and a drive mechanism 922 such as a motor. FIG. 2 shows a positional relationship between the drum 921 and the three head modules 3.

FIG. 2 is a view of the liquid ejecting apparatus 100 as seen in the x1 direction. The drum 921 is a cylindrical or columnar member of which the outer peripheral surface extends around a central axis Ax which is parallel to the x-axis. The drum 921 is driven around the central axis Ax by the drive mechanism 922. The outer peripheral surface of the drum 921 is charged by a charger (not shown). The medium PP is electrostatically adsorbed on the outer peripheral surface of the drum 921 by an electrostatic force caused by this charging.

Each of the head modules 3_1, 3_2, and 3_3 face the outer peripheral surface of the drum 921. The head modules 3_1, 3_2, and 3_3 are different from each other in posture around an axis parallel to a direction along the x-axis. Specifically, the head modules 3_1, 3_2, and 3_3, are arranged in this order along the outer peripheral surface of the drum 921 in a circumferential direction CD around the central axis Ax.

In addition, each of the head modules 3_1, 3_2, and 3_3 is disposed at a position after rotation around a rotation axis extending in the x1 direction, which is a longitudinal direction of the head module 3, so that a nozzle surface FN of the head 10 of the head module 3 is orthogonal to a radial direction RD of the central axis Ax of the drum 921 and is inclined with respect to a horizontal plane SF. Hereinafter, for simplification of the description, an angle formed by the nozzle surface FN and the horizontal plane SF may be referred to as a "disposition angle θ". A nozzle surface FN_1 of the head 10_1 included in the head module 3_1 is disposed such that the disposition angle θ becomes a disposition angle θ1. The nozzle surface FN_2 of the head 10_2 included in the head module 3_2 is disposed such that the disposition angle θ becomes a disposition angle θ2. The nozzle surface FN 3 of the head 10_3 included in the head module 3_3 is disposed such that the disposition angle θ becomes a disposition angle θ3. An angle formed by two planes is 0 degrees when the two planes are parallel to each other, and when two planes intersect each other, an angle formed by the two planes refers to the most acute angle among four angles that are formed by a first line segment and a second line segment perpendicular to a first line of intersection of the two planes. The first line segment is a line segment perpendicular to the first line of intersection and included in one of the two planes. The second line segment is a line segment perpendicular to the first line of intersection and included in the other of the two planes.

In FIG. 2, the disposition angle θ1 is 0 degrees, the disposition angle θ2 is 45 degrees, and the disposition angle θ3 is 90 degrees. However, these disposition angles θ1 to θ3 are merely examples, and in the following description, the disposition angles θ1 to θ3 may be different from the angles described above for the sake of convenience.

The description will be made referring again to FIG. 1. Under the control of the controller 90, the head modules 3 eject ink, which is supplied from the storage portions 93 respectively corresponding to the three head modules 3 via the circulation mechanisms 94 respectively corresponding to the three head modules 3, to the medium PP through each of a plurality of nozzles. The ink is supplied, by the pumps 931 controlled by the controller 90, from the liquid supply sources 930 respectively corresponding to the three head modules 3 to the storage portions 93 respectively corresponding to the three head modules 3. The three head modules 3 are line heads each of which includes a plurality of heads 10 that are disposed such that a plurality of nozzles are distributed over the entire medium PP in the direction along the x-axis. That is, the plurality of heads 10 constitute a line head that is long in a direction in which the x-axis extends.

Each of the three circulation mechanisms 94 is a mechanism that supplies ink to each of the plurality of heads 10 included in the head module 3 and that collects ink discharged from each of the plurality of heads 10 so that the ink is supplied to the heads 10 again. The circulation mechanism 94 includes supply paths 941 for supply of ink from the storage portion 93 to the plurality of heads 10, a collection path 942 provided to collect the ink from the plurality of heads 10 so that the ink returns to the storage portion 93, and a flow mechanism 943 provided to cause the ink to flow as appropriate. The flow mechanism 943 is provided between the supply paths 941. Under the control of the controller 90, the flow mechanism 943 causes ink in the supply paths 941 to flow. The flow mechanism 943 is, for example, a pump, a compressor, or the like. With the circulation mechanism 94 being operated, an increase in viscosity of ink in the head 10 can be suppressed, and air bubbles in a flow path of the head 10 can be discharged to the outside of the head 10.

Each of the three angular sensors 95 measures the disposition angles θ of the plurality of heads 10 included in the head module 3, and transmits, to the controller 90, angle information DI indicating the measured disposition angles. More specifically, the angular sensor 95_1 measures the disposition angle θ1 of any of the plurality of heads 10_1 and transmits, to the controller 90, angle information DI_1 indicating the disposition angle θ1. The angular sensor 95_2 measures the disposition angle θ2 of any of the plurality of heads 10_2 and transmits, to the controller 90, angle information DI_2 indicating the disposition angle θ2. The angular sensor 95_3 measures the disposition angle θ3 of any of the plurality of heads 10_3 and transmits, to the controller 90, angle information DI_3 indicating the disposition angle θ3. Each of the three angular sensors 95 is disposed in the vicinity of any one of the plurality of heads 10 included in the head module 3 in order to measure the disposition angles θ of the heads 10. Note that in the present embodiment, although the liquid ejecting apparatus 100 includes one angular sensor 95 corresponding to one head module 3, the angular sensor 95 may be included in the head 10.

With ejection of ink from the plurality of head modules 3 performed in parallel with transportation of the medium PP which is performed by the transport mechanism 92, the liquid ejecting apparatus 100 performs a printing process in which an image is formed on a surface of the medium PP by means of ink. Even during the printing process, the circulation mechanisms 94 operate so that ink is circulated between the storage portions 93 and the heads 10. Furthermore, the liquid ejecting apparatus 100 performs maintenance processes before and after the printing process. As one of the maintenance processes, the liquid ejecting apparatus 100 performs a circulation cleaning process of circulating the ink between the storage portions 93 and the heads 10. A flow rate in the circulation cleaning process is higher than the maximum flow rate in the printing process. The term "flow rate" means the amount of liquid moved per unit period. The maximum flow rate in the printing process is reached when a so-called solid image is formed on the medium PP. In the following description, the flow rate in the circulation cleaning process will be referred to as a "circulation cleaning flow rate". In addition, a period during which the circulation cleaning is performed will be referred to as a "circulation cleaning period". For example, the maximum flow rate in the printing process is 0.9 [g/sec]. The circulation cleaning flow rate is 1.0 [g/sec] or more although depending on the head 10.

The controller 90 controls the three circulation mechanisms 94. More specifically, the controller 90 controls the flow mechanisms 943 in the circulation mechanisms 94 to adjust the circulation cleaning flow rate or the circulation cleaning period. For example, when the flow mechanisms 943 are tube pumps, the controller 90 changes, as the adjustment of the circulation cleaning flow rate, the rotation speed of a rotor in a pump to perform adjustment to achieve a desired flow rate. In addition, when the flow mechanisms 943 are compressors, the controller 90 adjusts differential pressures of the compressors to perform adjustment to achieve a desired flow rate.

Hereinafter, the head modules 3, which collectively refer to the head modules 3_1, 3_2, and 3_3, will be described with reference to FIG. 3.

1-2: Configuration of Head Module 3

Figure 3:
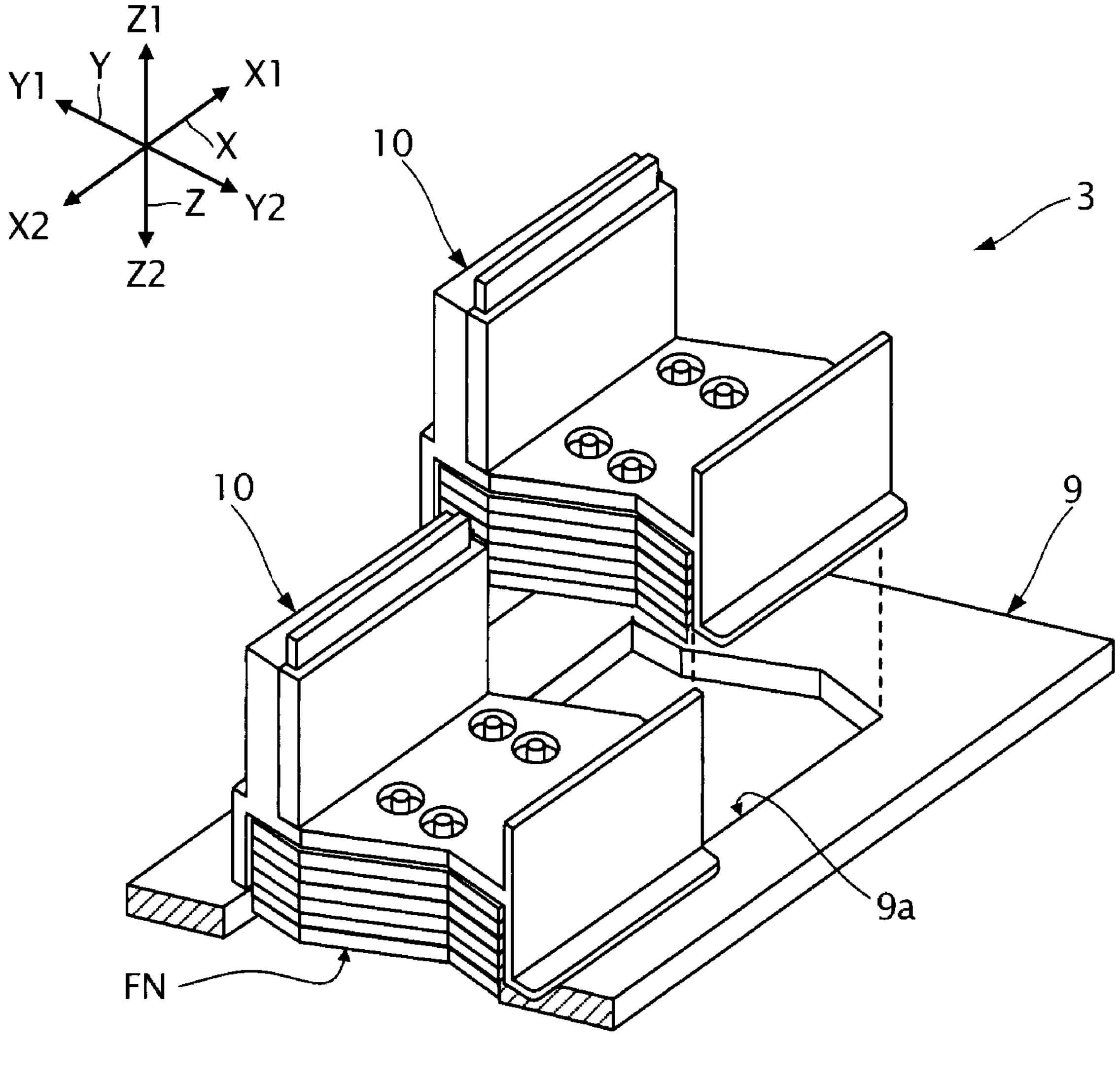
FIG. 3 is a perspective view of a head module.

FIG. 3 is a perspective view of the head module 3. In the following description, an XYZ coordinate system will be used in addition to the xyz coordinate system. In addition, one direction along an X-axis will be referred to as an X1 direction, and a direction opposite to the X1 direction will be referred to as an X2 direction. Similarly, opposite directions that extend along a Y-axis will be referred to as a Y1 direction and a Y2 direction. In addition, opposite directions that extend along a Z-axis will be referred to as a Z1 direction and a Z2 direction. The XYZ coordinate system is a local coordinate system showing coordinates based on the head module 3. When the posture of the head module 3 changes, a direction in which the X-axis extends, a direction in which the Y-axis extends, and a direction in which the Z-axis extends also change. For example, as shown in FIG. 2, a direction along the Y-axis of the head module 3_1 is different from a direction along the Y-axis of the head module 3_2.

The head module 3 includes the plurality of heads 10 and a head fixation substrate 9 that holds the plurality of heads 10. The plurality of heads 10 are arranged in parallel along the X-axis and are fixed to the head fixation substrate 9. Note that the head module 3 may be a line head that is composed of only one head 10 and that is long in the direction in which the X-axis extends, the only one head 10 being disposed such that a plurality of nozzles N are distributed over the entire medium PP in a direction along the X-axis. The head fixation substrate 9 includes a plurality of attachment holes 9*a* for attachment of the heads 10. The heads 10 are supported by the head fixation substrate 9 in a state of being inserted into the attachment holes 9*a*.

1-3: Configuration of Head 10

Figure 4:
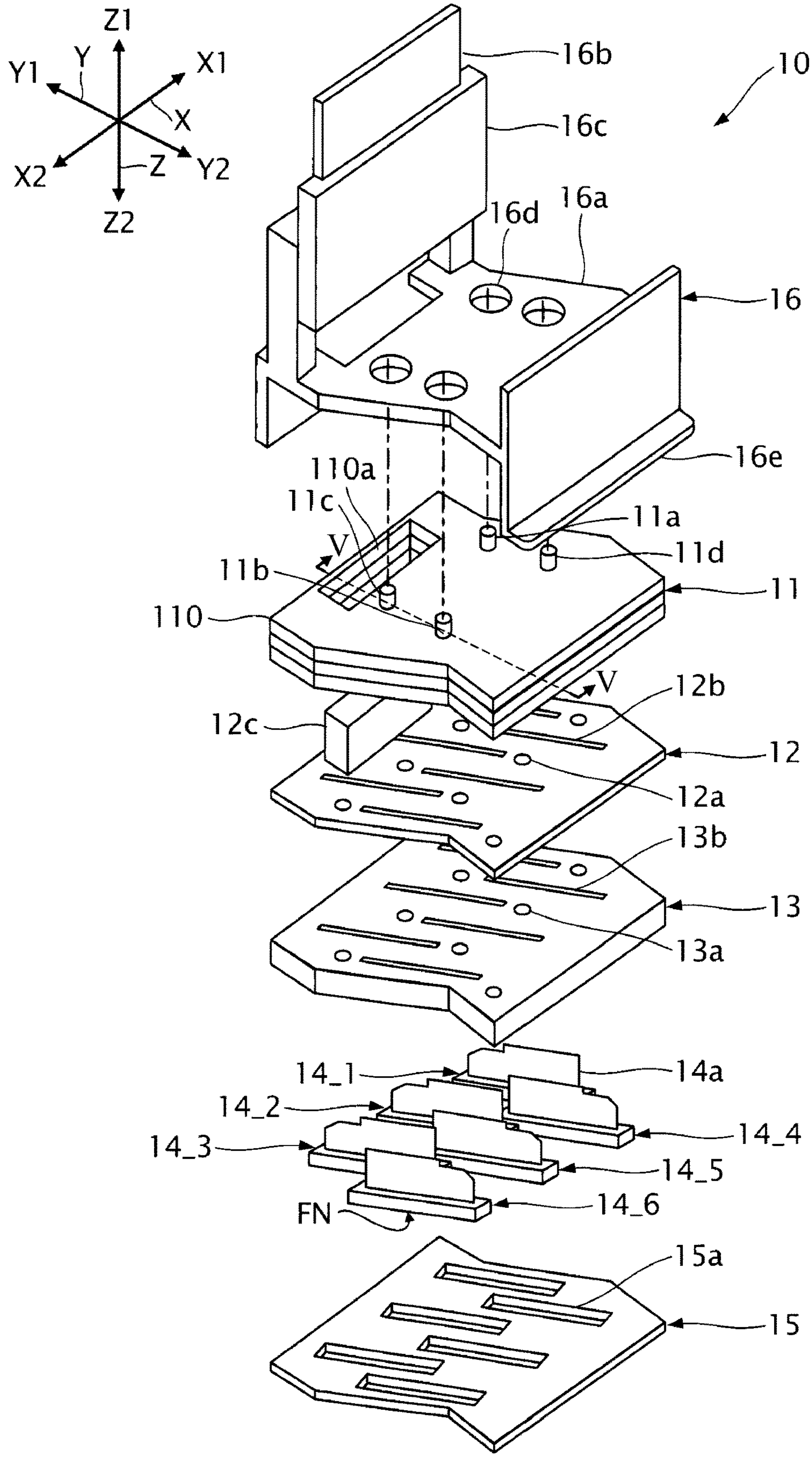
FIG. 4 is an exploded perspective view of a head.

FIG. 4 is an exploded perspective view of the head 10. As shown in FIG. 4, the head 10 includes a flow path structure 11, a wiring substrate 12, a holder 13, a plurality of head chips 14_1, 14_2, 14_3, 14_4, 14_5, and 14_6, a fixation plate 15, and a base 16. The flow path structure 11, the wiring substrate 12, the holder 13, the plurality of head chips 14_1, 14_2, 14_3, 14_4, 14_5, and 14_6, the fixation plate 15, and the base 16 are disposed in the order of the base 16, the flow path structure 11, the wiring substrate 12, the holder 13, the plurality of head chips 14_1, 14_2, 14_3, 14_4, 14_5, and 14_6, and the fixation plate 15 in the Z2 direction. Hereinafter, each part of the head 10 will be described in order. Note that, hereinafter, each of the head chips 14_1, 14_2, 14_3, 14_4, 14_5, and 14_6 may be referred to as a head chip 14.

The flow path structure 11 is a structure in which a flow path provided to cause ink to flow between the circulation mechanism 94 and the plurality of head chips 14 is provided. As shown in FIG. 4, the flow path structure 11 includes a flow path member 110 and coupling pipes 11*a*, 11*b*, 11*c*, and 11*d*. Although not shown in FIG. 4, the flow path member 110 is provided with an inflow flow path through which the first ink flows into the plurality of head chips 14, an inflow flow path through which the second ink flows into the plurality of head chips 14, an outflow flow path through which the first ink flows out from the plurality of head chips 14, and an outflow flow path through which the second ink flows out from the plurality of head chips 14. Specifically, the coupling pipes 11*a* and 11*b* communicate with the inflow flow paths, and the coupling pipes 11*c* and 11*d* communicate with the outflow flow paths. Filters 116 provided to capture foreign substances and the like are disposed between the coupling pipe 11*a* and the inflow flow path and between the coupling pipe 11*b* and the inflow flow path. However, the filters 116 may be disposed in the middle of the inflow flow paths.

Figure 5:
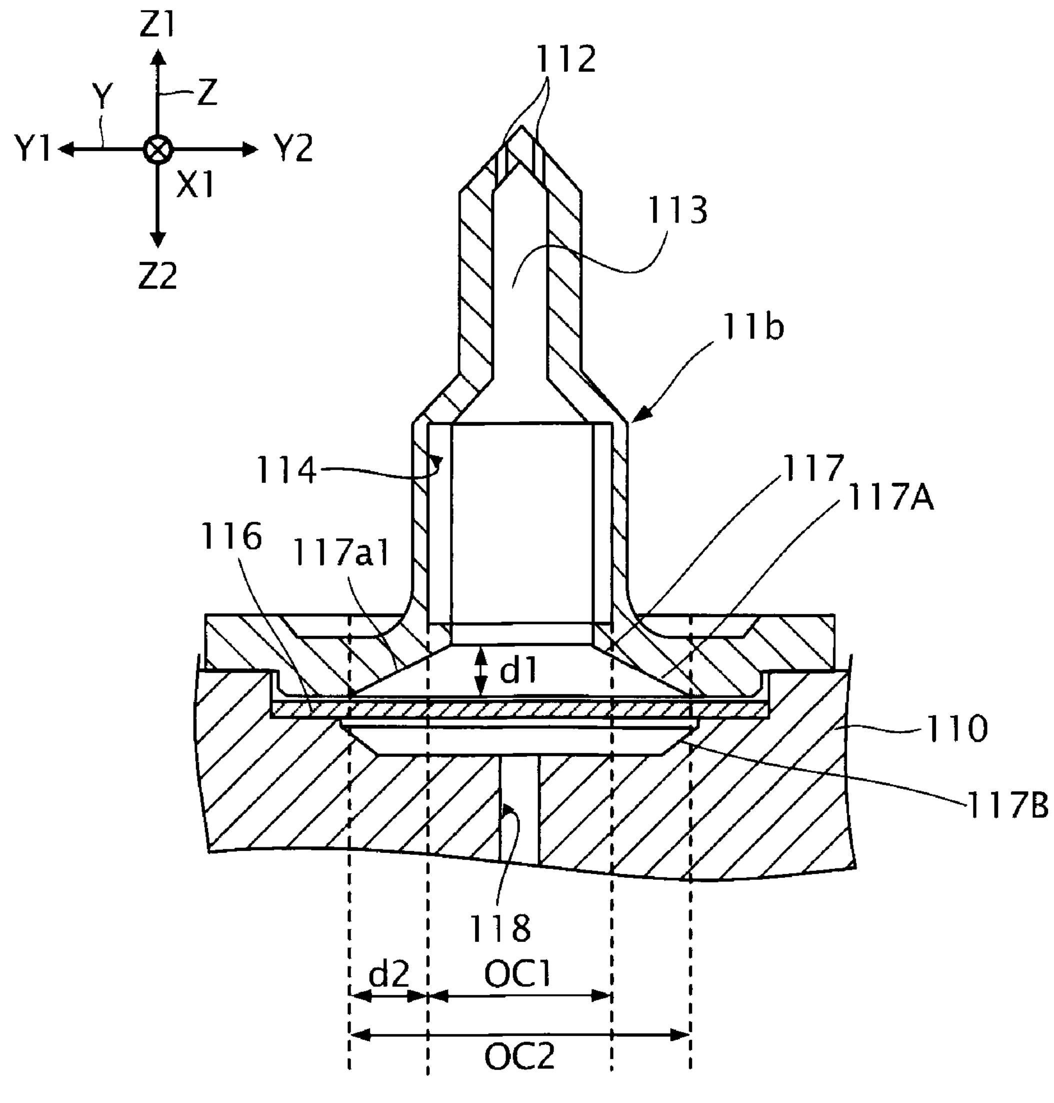
FIG. 5 is a cross-sectional view taken along line V-V in FIG. 4.

FIG. 5 is a cross-sectional view taken along line V-V in FIG. 4. The line V-V is a virtual straight line that is parallel to the Y-axis and along which the coupling pipe 11*b* is cut. The coupling pipe 11*b* is a hollow needle-shaped member, and is provided with ink introduction holes 112, an ink introduction path 113, and an upstream chamber 117A. The ink introduction holes 112 are provided at an end portion of the coupling pipe 11*b* in the Z1 direction and communicate with the ink introduction path 113. The ink introduction path 113 is an internal space of the coupling pipe 11*b*, and the ink introduction holes 112 communicate with the upstream chamber 117A through the ink introduction path 113. Regarding the flow path member 110, a flow path 118, which is a portion of an inflow flow path, is shown in FIG. 5.

An air bubble chamber 114 defines a portion of a filter chamber 117 including the filter 116. The filter chamber 117 is partitioned by the filter 116 into the upstream chamber 117A positioned relatively closer to a side to which the Z1 direction extends and a downstream chamber 117B positioned relatively closer to a side to which the Z2 direction extends. In addition, the upstream chamber 117A includes the air bubble chamber 114 that temporarily stores air bubbles contained in ink and a width increase portion 117*a*1 that is disposed between the air bubble chamber 114 and the filter 116. When the filter chamber 117 is seen in a direction along the Z-axis, which is a thickness direction of the filter 116, the area of the width increase portion 117*a*1 is larger than the area of the air bubble chamber 114. In addition, a maximum dimension d1 of the width increase portion 117*a*1 in the direction along the Z-axis, which is the thickness direction, is smaller than a difference d2 between an outer circumference OC1 of the air bubble chamber 114 and an outer circumference OC2 of the width increase portion 117*a*1 in an XY plane as seen in the direction along the Z-axis. Air bubbles stored in the air bubble chamber 114 flow out from the flow path 118 to the outside of the filter chamber 117 after proceeding through the width increase portion 117*a*1, the filter 116, and the downstream chamber 117B in this order.

The filter 116 is a plate-shaped or sheet-shaped member that captures foreign substances and the like mixed in ink while allowing the ink to pass therethrough. The filter 116 is provided along the XY plane. The filter 116 is made of, for example, a metal fiber such as a twilled dutch weave or a plain dutch weave. The configuration of the filter 116 is not limited to a configuration in which a metal fiber is used, and the filter 116 may be made of a resin fiber such as non-woven fabric, for example.

In FIG. 5, the filter 116 disposed between the coupling pipe 11*b* and the inflow flow path is shown. However, the filter 116 disposed between the coupling pipe 11*a* and the inflow flow path also has substantially the same configuration as the filter 116 disposed between the coupling pipe 11*b* and the inflow flow path. The expression "being substantially the same" means not only being completely the same but also being able to be considered as being the same in consideration of manufacturing errors.

The description will be made referring again to FIG. 4. The flow path member 110 is composed of a plurality of plate-shaped members. The plurality of plate-shaped members are provided with grooves, holes, or the like as appropriate, so that flow paths such as the inflow flow paths and the outflow flow paths are formed. The flow path member 110 is provided with a hole 110*a* into which a connector 12*c*, which will be described later, is inserted. The coupling pipes 11*a*, 11*b*, 11*c*, and 11*d* protrude at a surface of the flow path member 110 that faces the Z1 direction.

The coupling pipe 11*a* is a pipe body that constitutes a flow path for supply of the first ink to the flow path member 110. In addition, the coupling pipe lib is a pipe body that constitutes a flow path for supply of the second ink to the flow path member 110. Meanwhile, the coupling pipe 11*c* is a pipe body that constitutes a flow path for discharge of the first ink from the flow path member 110. In addition, the coupling pipe 11*d* is a pipe body that constitutes a flow path for discharge of the second ink from the flow path member 110.

The wiring substrate 12 is a mounted component for electrical coupling between the plurality of head chips 14 and a collective substrate 16*b* which will be described later. The wiring substrate 12 is, for example, a rigid wiring substrate. The wiring substrate 12 is disposed between the flow path structure 11 and the holder 13, and the connector 12*c* is disposed at a surface of the wiring substrate 12 that faces the flow path structure 11. The connector 12*c* is a coupling component coupled to the collective substrate 16*b* which will be described later. In addition, the wiring substrate 12 is provided with a plurality of holes 12*a* and a plurality of opening portions 12*b*. Each hole 12*a* is a hole for allowance of coupling between the flow path structure 11 and the holder 13. Each opening portion 12*b* is a hole through which a wiring member 14*a* that couples the head chip 14 and the wiring substrate 12 passes. The wiring member 14*a* is coupled to a surface of the wiring substrate 12 that faces the Z1 direction. The wiring member 14*a* is a member including a wire electrically coupled to the drive elements Ea or the drive elements Eb which will be described later, and is, for example, an FPC, a COF, or the like. "FPC" is an abbreviation for "Flexible Printed Circuits". In addition, "COF" is an abbreviation for "Chip On Film".

The holder 13 is a structure that accommodates and supports the plurality of head chips 14. The holder 13 is formed of, for example, a resin material, a metal material, or the like. The holder 13 has a plate-like shape that extends in directions perpendicular to the Z-axis. The holder 13 is provided with a plurality of ink holes 13*a* and a plurality of wiring holes 13*b*. Each ink hole 13*a* is an opening on the flow path structure 11 side in a flow path through which ink flows between the head chip 14 and the flow path structure 11. Each wiring hole 13*b* is a hole through which the wiring member 14*a* that couples the head chip 14 and the wiring substrate 12 passes. Here, although not shown in the drawings, an inflow flow path through which the first ink flows into the head chips 14, an inflow flow path through which the second ink flows into the head chips 14, a circulation flow path through which the first ink flows from the head chips 14 to the outflow flow paths of the flow path structure 11, and a circulation flow path through which the second ink flows from the head chips 14 to the outflow flow paths of the flow path structure 11 are provided in the holder 13. In addition, although not shown in the drawings, a branch flow path for distribution or concentration of ink between the ink holes 13*a* and the plurality of head chips 14 is provided inside the holder 13. In addition, although not shown in the drawings, a surface of the holder 13 that faces the Z2 direction is provided with a plurality of recess portions for accommodation of the plurality of head chips 14.

The head chips 14 eject ink. Specifically, although not shown in FIG. 4, each head chip 14 includes a plurality of nozzles N for ejection of the first ink and a plurality of nozzles N for ejection of the second ink. The nozzles N are provided at a nozzle surface FN, which is a surface of each head chip 14 that faces the Z2 direction. The configuration of the head chips 14 will be described later. The nozzle surfaces FN are provided along the XY plane. As described above, the filters 116 are also provided along the XY plane. Therefore, the filters 116 are provided substantially parallel to the nozzle surfaces FN. The expression "being substantially parallel" means not only being completely parallel but also being able to be considered to be parallel in consideration of manufacturing errors.

The fixation plate 15 is a plate member for fixation of the plurality of head chips 14 to the holder 13. Specifically, the fixation plate 15 is disposed in a state where the plurality of head chips 14 are interposed between the fixation plate 15 and the holder 13, and is fixed to the holder 13 by means of an adhesive. The fixation plate 15 is formed of, for example, a metal material or the like. The fixation plate 15 is provided with a plurality of opening portions 15*a* for exposure of the nozzles of the plurality of head chips 14. In an example shown in FIG. 4, the plurality of opening portions 15*a* are respectively provided for the head chips 14. Note that, the opening portion 15*a* may be shared by two or more head chips 14.

The base 16 is a member for fixation of the flow path structure 11, the wiring substrate 12, the holder 13, the plurality of head chips 14, and the fixation plate 15 to the head fixation substrate 9. The base 16 includes a main body 16*a*, the collective substrate 16*b*, and a cover 16*c*.

The main body 16*a* is fixed to the holder 13 by being screwed or the like so that the flow path structure 11 and the wiring substrate 12 disposed between the base 16 and the holder 13 are held by the main body 16*a*. The main body 16*a* is formed of, for example, a resin material. The main body 16*a* includes a plate-shaped portion that faces the above-described flow path member 110 and the plate-shaped portion is provided with a plurality of holes 16*d* into which the above-described coupling pipes 11*a*, 11*b*, 11*c*, and 11*d* are inserted. In addition, the main body 16*a* includes a portion that extends in the Z2 direction from the plate-shaped portion, and a tip end of that portion is provided with a flange 16*e* for fixation to the head fixation substrate 9.

The collective substrate 16*b* is a mounted component for electrical coupling between the controller 90 and the above-described wiring substrate 12. The collective substrate 16*b* is, for example, a rigid wiring substrate. The cover 16*c* is a plate-shaped member for protection of the collective substrate 16*b* and for fixation of the collective substrate 16*b* to the main body 16*a*. The cover 16*c* is formed of, for example, a resin material or the like, and the cover 16*c* is fixed to the main body 16*a* by being screwed or the like.

1-4: Head Chip 14

Figure 6:
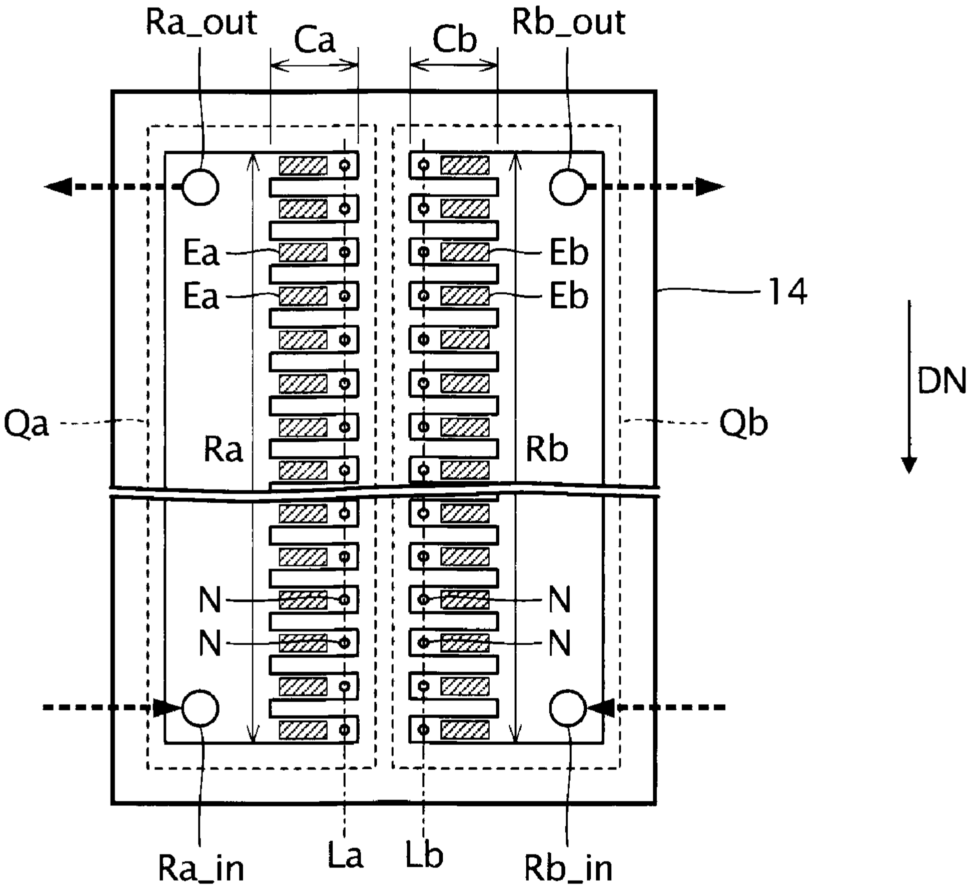
FIG. 6 is a plan view of a head chip.

FIG. 6 is a plan view of the head chip 14. FIG. 6 schematically shows the internal structure of the head chip 14 as seen in the Z1 direction. As shown in FIG. 6, the head chip 14 includes a liquid ejection section Qa and a liquid ejection section Qb. The liquid ejection section Qa includes a nozzle row La composed of a plurality of the nozzles N that eject the first ink supplied from the above-described circulation mechanism 94. The liquid ejection section Qb includes a nozzle row Lb composed of a plurality of the nozzles N that eject the second ink supplied from the circulation mechanism 94. The plurality of nozzles N in each of the nozzle row La and the nozzle row Lb are arranged in a direction DN.

The liquid ejection section Qa includes a common liquid chamber Ra, a plurality of pressure chambers Ca, and a plurality of the drive elements Ea. The common liquid chamber Ra is continuous over the plurality of nozzles N of the nozzle row La. The pressure chamber Ca and the drive element Ea are provided for each of the nozzles N of the nozzle row La. The pressure chamber Ca is a space communicating with the nozzle N. Each of the plurality of pressure chambers Ca is filled with the first ink supplied from the common liquid chamber Ra. The drive element Ea changes the pressure of the first ink in the pressure chamber Ca. The drive element Ea is, for example, a piezoelectric element that changes the volume of the pressure chamber Ca by deforming a wall surface of the pressure chamber Ca or is a heat generating element that generates air bubbles in the pressure chamber Ca by heating the first ink in the pressure chamber Ca. When the drive element Ea is driven by the drive signal Com and changes the pressure of the first ink in the pressure chamber Ca, the first ink in the pressure chamber Ca is ejected through the nozzle N.

As with the liquid ejection section Qa, the liquid ejection section Qb includes a common liquid chamber Rb, a plurality of pressure chambers Cb, and a plurality of the drive elements Eb. The common liquid chamber Rb is continuous over the plurality of nozzles N of the nozzle row Lb. The pressure chamber Cb and the drive element Eb are provided for each of the nozzles N of the nozzle row Lb. Each of the plurality of pressure chambers Cb is filled with the second ink supplied from the common liquid chamber Rb. The drive element Eb is, for example, a piezoelectric element or a heat generating element as described above. When the drive element Eb is driven by the drive signal Com and changes the pressure of the second ink in the pressure chamber Cb, the second ink in the pressure chamber Cb is ejected through the nozzle N.

As shown in FIG. 6, the head chip 14 is provided with an introduction port Ra in, a discharge port Ra_out, an introduction port Rb_in, and a discharge port Rb_out. Each of the introduction port Ra in and the discharge port Ra_out communicates with the common liquid chamber Ra. Each of the introduction port Rb_in and the discharge port Rb_out communicates with the common liquid chamber Rb. Hereinafter, the introduction port Ra in and the introduction port Rb_in will be collectively referred to as introduction ports R_in. The discharge port Ra_out and the discharge port Rb_out will be collectively referred to as discharge ports R_out.

In the case of the head chip 14 described above, the first ink stored in the common liquid chamber Ra without being ejected through each nozzle N of the nozzle row La circulates while proceeding through the discharge port Ra_out, the circulation flow path for the first ink in the holder 13, an outflow flow path for the first ink in the flow path structure 11, the storage portion 93 for the first ink in the circulation mechanism 94, an inflow flow path for the first ink in the flow path structure 11, the inflow flow path for the first ink in the holder 13, the introduction port Ra in, and the common liquid chamber Ra in this order. Similarly, the second ink stored in the common liquid chamber Rb without being ejected through each nozzle N of the nozzle row Lb circulates while proceeding through the discharge port Rb_out, the circulation flow path for the second ink in the holder 13, an outflow flow path for the second ink in the flow path structure 11, the storage portion 93 for the second ink in the circulation mechanism 94, an inflow flow path for the second ink in the flow path structure 11, the inflow flow path for the second ink in the holder 13, the introduction port Rb_in, and the common liquid chamber Rb_in this order.

1-5: Regarding Air Bubbles in Upstream Chamber 117A

When air bubbles are generated in the upstream chamber 117A, a portion of the filter 116 may be clogged with the air bubbles. As a result, there may be an increase in pressure loss in the filter 116 and an ink supply pressure may fluctuate. Therefore, meniscuses may not be normally formed in the nozzles N and an ejection abnormality may occur. The ejection abnormality is a state where ink cannot be ejected in a way defined by the drive signal Com even when an attempt is made to eject the ink through the nozzles N by means of the drive signal Com. Here, the way in which the ink is ejected as defined by the drive signal Com is that the nozzles N eject an amount of ink defined by the waveform of the drive signal Com and the nozzles N eject the ink at an ejection speed defined by the waveform of the drive signal Com. That is, examples of the state where the ink cannot be ejected in the way in which the ink is ejected as defined by the drive signal Com include a state where the ink is ejected through the nozzles N in an amount less than the amount of ink defined by the drive signal Com, a state where the ink is ejected through the nozzles N in an amount greater than the amount of ink defined by the drive signal Com, and a state where the ink is ejected at a speed different from an ink ejection speed defined by the drive signal Com and the ink cannot land at a desired landing position on the medium PP in addition to a state where the ink cannot be ejected through the nozzles N.

1-5-1: Problems in Circulation Cleaning Operation in Related Art

Part of air bubbles in the upstream chamber 117A can be discharged from the filter chamber 117 by means of even a circulation cleaning operation in the related art. However, in the case of the circulation cleaning operation in the related art, minute air bubbles smaller than the above-described part of the air bubbles may remain in the filter chamber 117.

Figure 7:
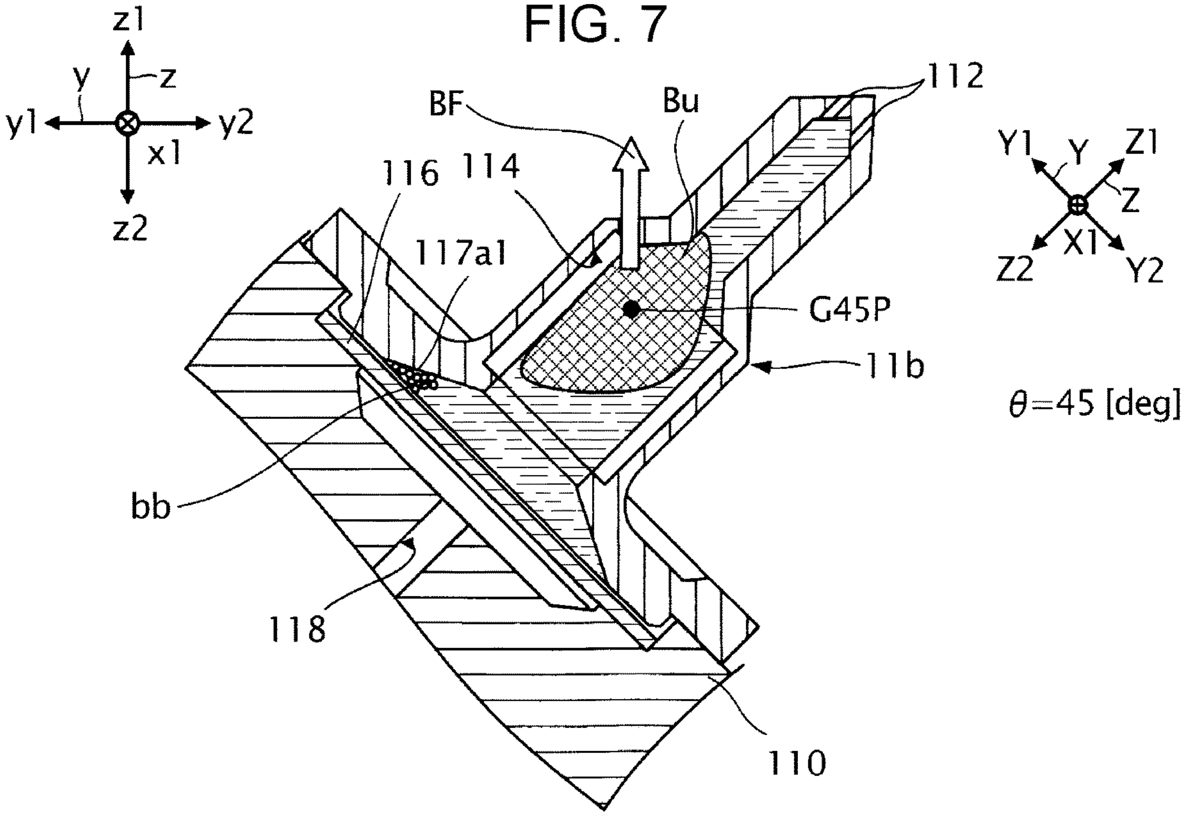
FIG. 7 is a view showing the state of the vicinity of a filter at the time of printing, in which a disposition angle is 45 degrees.
Figure 8:
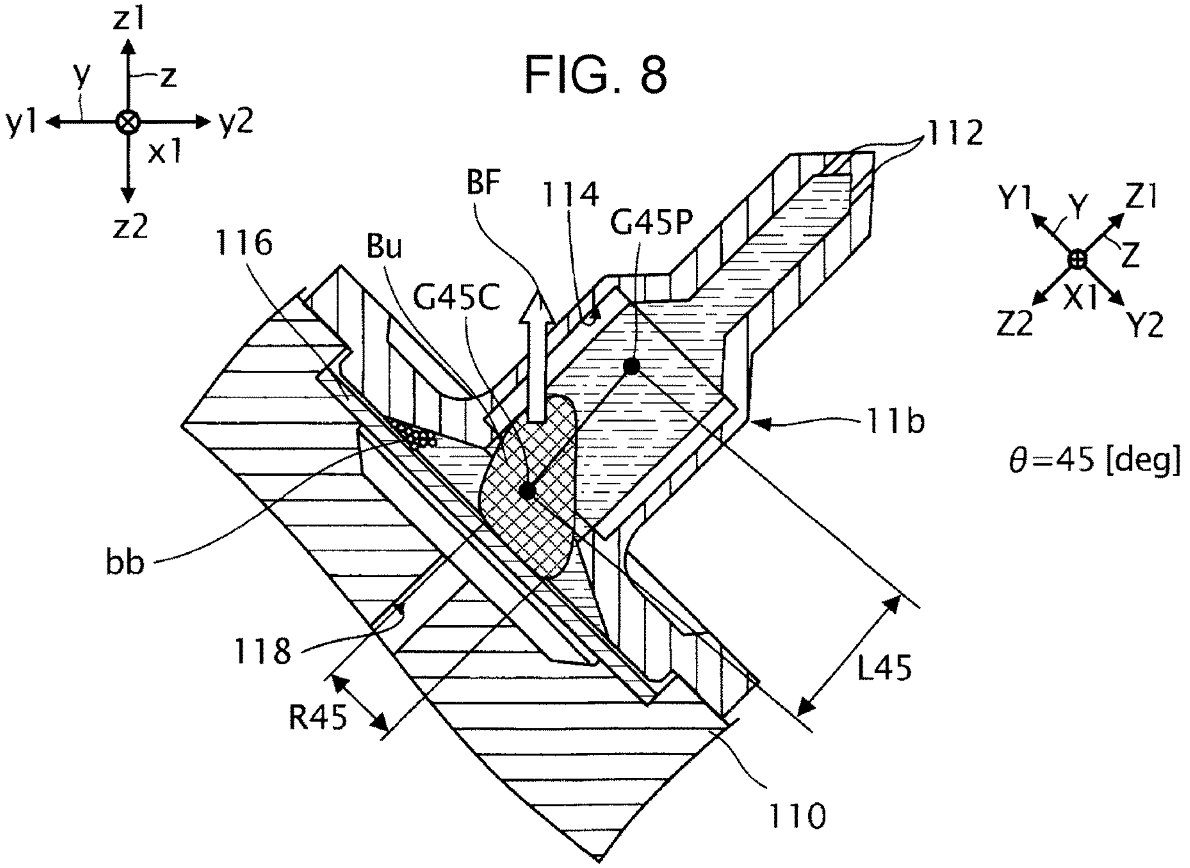
FIG. 8 is a view showing the state of the vicinity of the filter at the time of a circulation cleaning operation, in which the disposition angle is 45 degrees.
Figure 9:
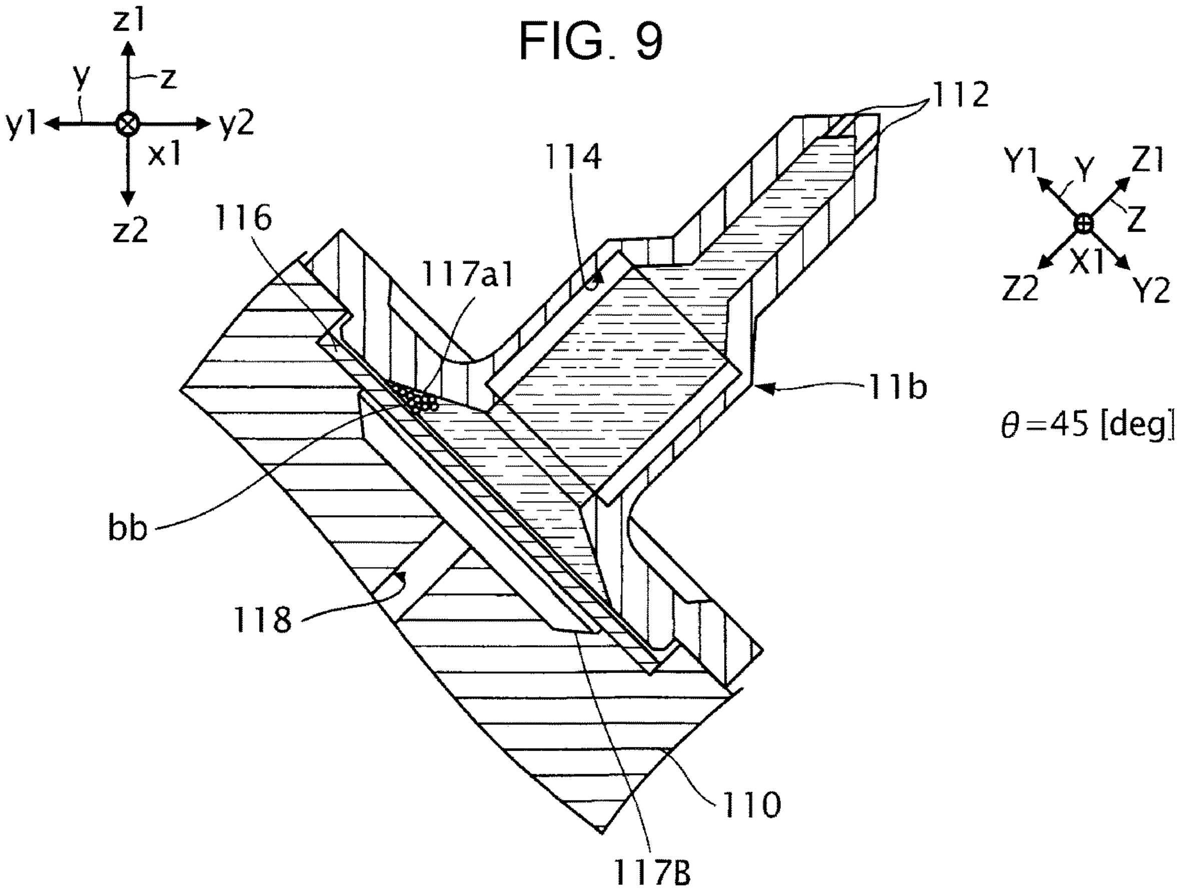
FIG. 9 is a view showing the state of the vicinity of the filter after the circulation cleaning operation, in which the disposition angle θ is 45 degrees.

FIG. 7 is a view showing a state immediately before the circulation cleaning operation, that is, a state where air bubbles enter and grow in the upstream chamber 117A as a predetermined period from a previous circulation cleaning operation to a current circulation cleaning operation elapses with a printing period in which printing is performed interposed between the circulation cleaning operations. In addition, FIG. 7 is a view showing the state of the vicinity of the filter 116 at the time of printing, in which the disposition angle θ is 45 degrees. FIG. 8 is a view showing the state of the vicinity of the filter 116 at the time of the circulation cleaning operation, in which the disposition angle θ is 45 degrees. FIG. 9 is a view showing the state of the vicinity of the filter 116 after the circulation cleaning operation, in which the disposition angle θ is 45 degrees.

As shown in FIGS. 7 and 8, in the upstream chamber 117A, a large air bubble Bu is present, due to a buoyant force, at an end portion in the air bubble chamber 114 in the z1 direction. In addition, in the upstream chamber 117A, small air bubbles bb are present, due to buoyant force, in the vicinity of an end portion of the width increase portion 117a1 in the Y1 direction. In addition, in a state shown in FIG. 7, the large air bubble Bu and the small air bubbles bb are present at different positions in the upstream chamber 117A. When the large air bubble Bu comes into contact with the filter 116 during printing and thus a portion of the filter 116 is clogged, the ejection abnormality is likely to occur as described above. Therefore, it is preferable that the large air bubble Bu is separated from the filter 116 at the time of printing, that is, in a stage before the circulation cleaning operation. As shown in FIG. 7, the large air bubble Bu is positioned to be separated from the filter 116 in the z1 direction. In FIG. 7, the disposition angle θ is 45 degrees, and a gravity center G45P of the large air bubble Bu at the time printing is shown. The gravity center is a point where the sum of the first moments of area of a target shape is zero.

At the time of the circulation cleaning operation, the large air bubble Bu needs to come into contact with the filter 116 so that the large air bubble Bu is discharged in the Z2 direction. In an example shown in FIG. 8, ink flows in the Z2 direction at a higher flow rate than a flow rate at the time of printing due to the circulation cleaning operation. Therefore, the large air bubble Bu moves in the Z2 direction. In FIG. 8, the disposition angle θ is 45 degrees, and a gravity center G45C of the large air bubble Bu at the time of the circulation cleaning operation is shown.

As shown in FIG. 8, since ink flows in the Z2 direction, the large air bubble Bu moves in the Z2 direction. However, a buoyant force BF in the z1 direction acts on the large air bubble Bu. In the example shown in FIG. 8, a direction in which the ink flows and a direction in which the buoyant force BF acts intersect each other. Therefore, a component of the buoyant force BF in the Z1 direction is canceled out by the flow of the ink, but a component of the buoyant force BF in the Y1 direction is not canceled out by the flow of the ink. As shown in FIG. 8, a distance by which the large air bubble Bu moves when the disposition angle θ is 45 degrees is a distance L45 from the gravity center G45P shown in FIG. 7 to the gravity center G45C shown in FIG. 8.

As a result of movement of the large air bubble Bu in the Z2 direction, the large air bubble Bu comes into contact with the filter 116. The area of contact between the large air bubble Bu and the filter 116 is an area R45 in the example shown in FIG. 8. The component of the buoyant force BF in the Y1 direction is not canceled out by the flow of the ink and the large air bubble Bu moves in the Z2 direction as the ink flows in the Z2 direction. As a result, the shape of the large air bubble Bu is changed to a shape that is long in the direction along the Z-axis such that the large air bubble Bu comes into contact with a wall surface of the air bubble chamber 114 in the Z1 direction and comes into contact with the filter 116 in the Z2 direction. Since the shape of the large air bubble Bu is long in the direction along the Z-axis, the width of the large air bubble Bu in the direction along the Y-axis is small.

Since the width of the air bubble Bu in the Y-axis direction is small and the small air bubbles bb are present on a side, to which the Y1 direction extends, as seen from the large air bubble Bu. Therefore, the large air bubble Bu does not come into contact with the small air bubbles bb in the width increase portion 117*a*1. Therefore, in the width increase portion 117*a*1, the small air bubbles bb are not absorbed by the large air bubble Bu, and as a result, the small air bubbles bb do not disappear.

Thereafter, due to further inflow of the ink, the large air bubble Bu passes through the filter 116 and then flows out to the outside of the filter chamber 117 through the flow path 118. However, as shown in FIG. 9, the small air bubbles bb remain in the vicinity of the end portion of the width increase portion 117*a*1 in the Y1 direction. When a printing process is performed again in a state where the small air bubbles bb remain in the width increase portion 117*a*1 as described above, the filter 116 is clogged with the small air bubbles bb, there is an increase in pressure loss of the filter 116, and there is a risk that ejection abnormality may occur.

1-5-2: Circulation Cleaning Operation in Present Embodiment

Therefore, in the present embodiment, the controller 90 performs two circulation cleaning operations, which are a first circulation cleaning operation and a second circulation cleaning operation. The first circulation cleaning operation is an operation of circulating ink at a first flow rate. The second circulation cleaning operation is an operation of circulating the ink at a second flow rate higher than the first flow rate. Here, the "first flow rate" is a flow rate at which an air bubble of which the size is equal to or greater than a predetermined size does not pass through the filter 116. More specifically, the "first flow rate" is a flow rate at which the large air bubble Bu, which is the largest air bubble present in the upstream chamber 117A, does not pass through the filter 116. The "second flow rate" is a flow rate at which an air bubble of which the size is equal to or greater than the predetermined size passes through the filter 116. More specifically, the "second flow rate" is a flow rate at which the large air bubble Bu, which is the largest air bubble present in the upstream chamber 117A, passes through the filter 116. Here, the term "flow rate" means the amount of ink passing through the filter 116 per unit time. In addition, the term "an air bubble having the predetermined size" means an air bubble having such a size that the air bubble cannot pass through the filter 116 even when ink passes through the filter 116 at the maximum flow rate at the time of a printing operation. For example, "an air bubble having the predetermined size" is an air bubble of which the size is larger than the size of holes of the filter 116.

Note that the first flow rate is higher than the maximum flow rate of ink passing through the filter 116 at the time of printing.

Furthermore, in the present embodiment, the controller 90 causes, by means of the first circulation cleaning operation, the large air bubble Bu to come into contact with the small air bubbles bb so that the large air bubble Bu absorbs the small air bubbles bb. As a result, the large air bubble Bu and the small air bubbles bb are integrated with each other to form a new large air bubble Bu. Thereafter, the controller 90 causes, by means of the second circulation cleaning operation, the new large air bubble Bu to pass through the filter 116 and to flow out to the outside of the filter chamber 117 through the flow path 118 thereafter. As a result, the small air bubbles bb do not remain in the width increase portion 117*a*1. In addition, a risk that the filter 116 may be clogged with the small air bubbles bb when a printing operation is performed again is lowered. Note that the second circulation cleaning operation corresponds to the circulation cleaning operation in the related art shown in FIG. 8.

In the present embodiment, the controller 90 performs, with respect to the head modules 3, a circulation cleaning process of performing the second circulation cleaning operation after performing the first circulation cleaning operation. Here, the first circulation cleaning operation is an example of a "first circulation operation". The second circulation cleaning operation is an example of a "second circulation operation". The circulation cleaning process of performing the second circulation cleaning operation after performing the first circulation cleaning operation is an example of a "first circulation cleaning process".

Figure 10:
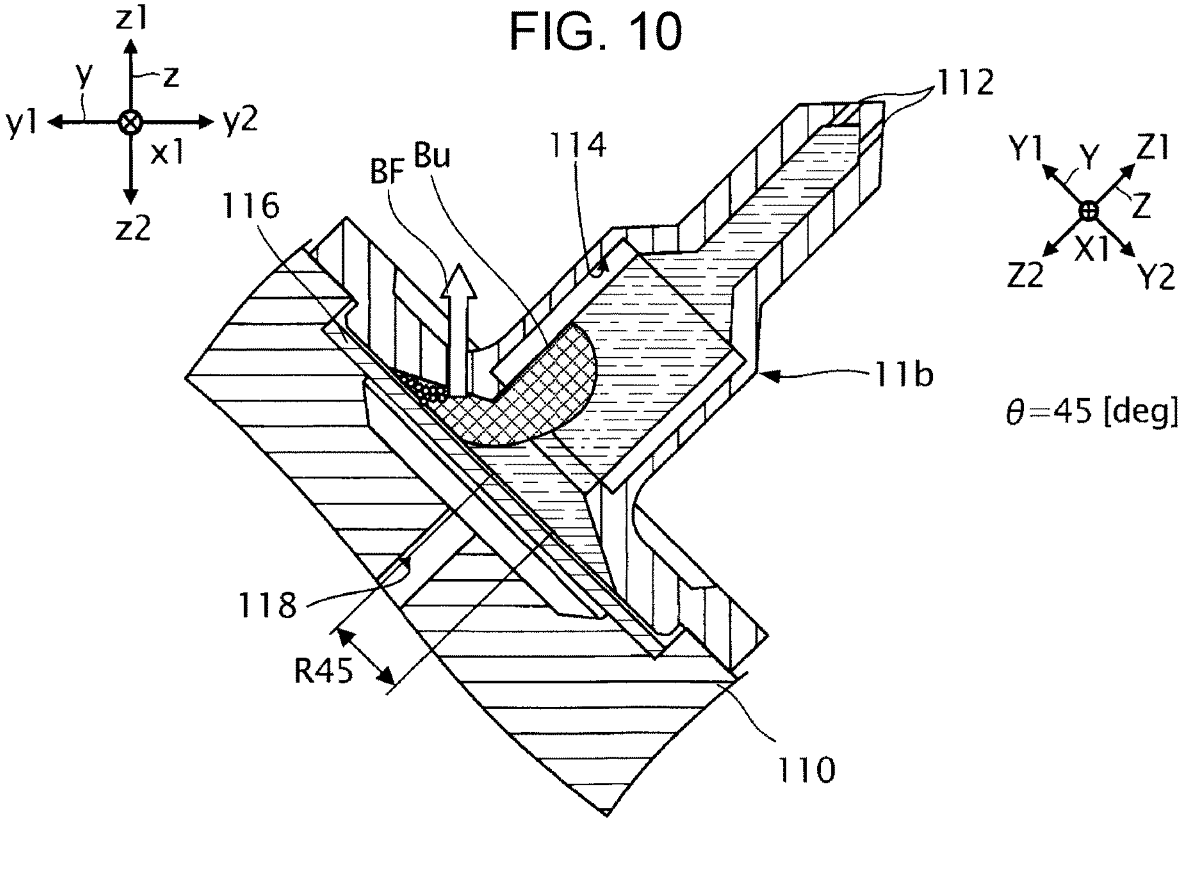
FIG. 10 is a view showing the state of the vicinity of the filter at the time of a first circulation cleaning operation, in which the disposition angle is 45 degrees.
Figure 11:
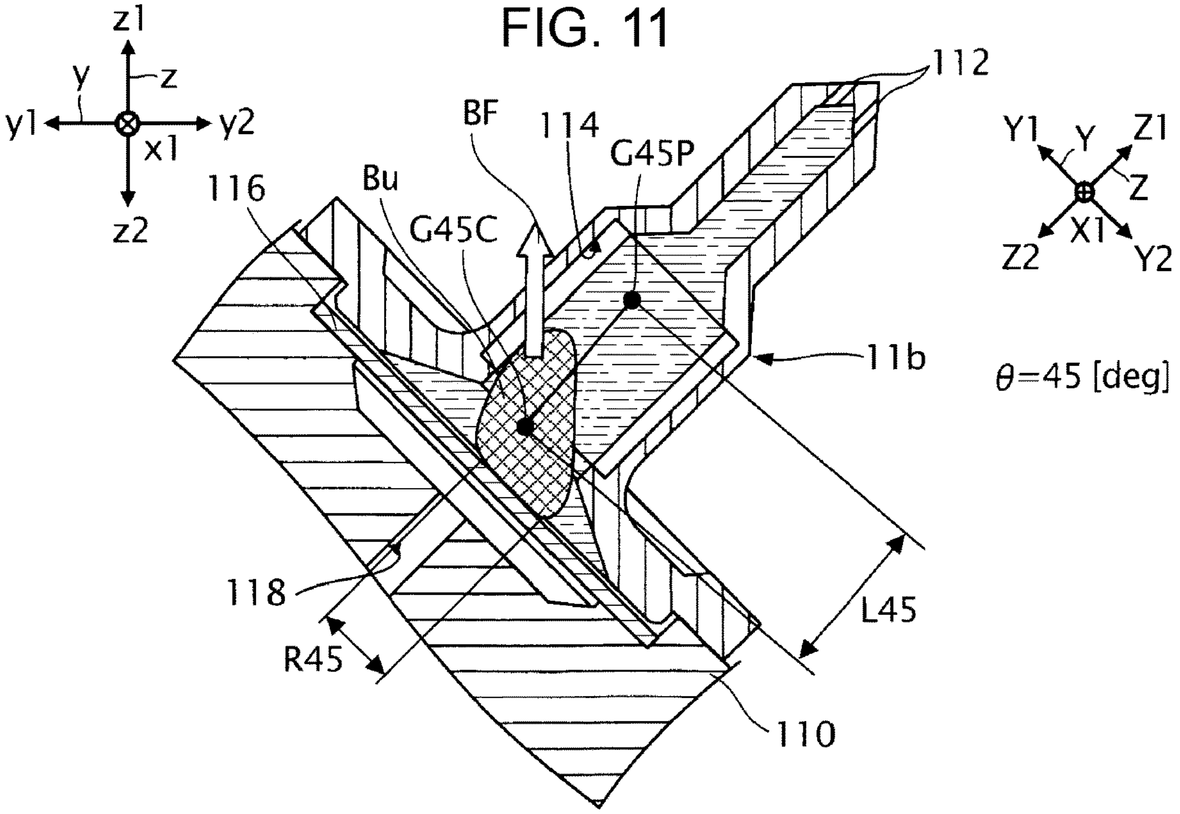
FIG. 11 is a view showing the state of the vicinity of the filter at the time of a second circulation cleaning operation, in which the disposition angle is 45 degrees.
Figure 12:
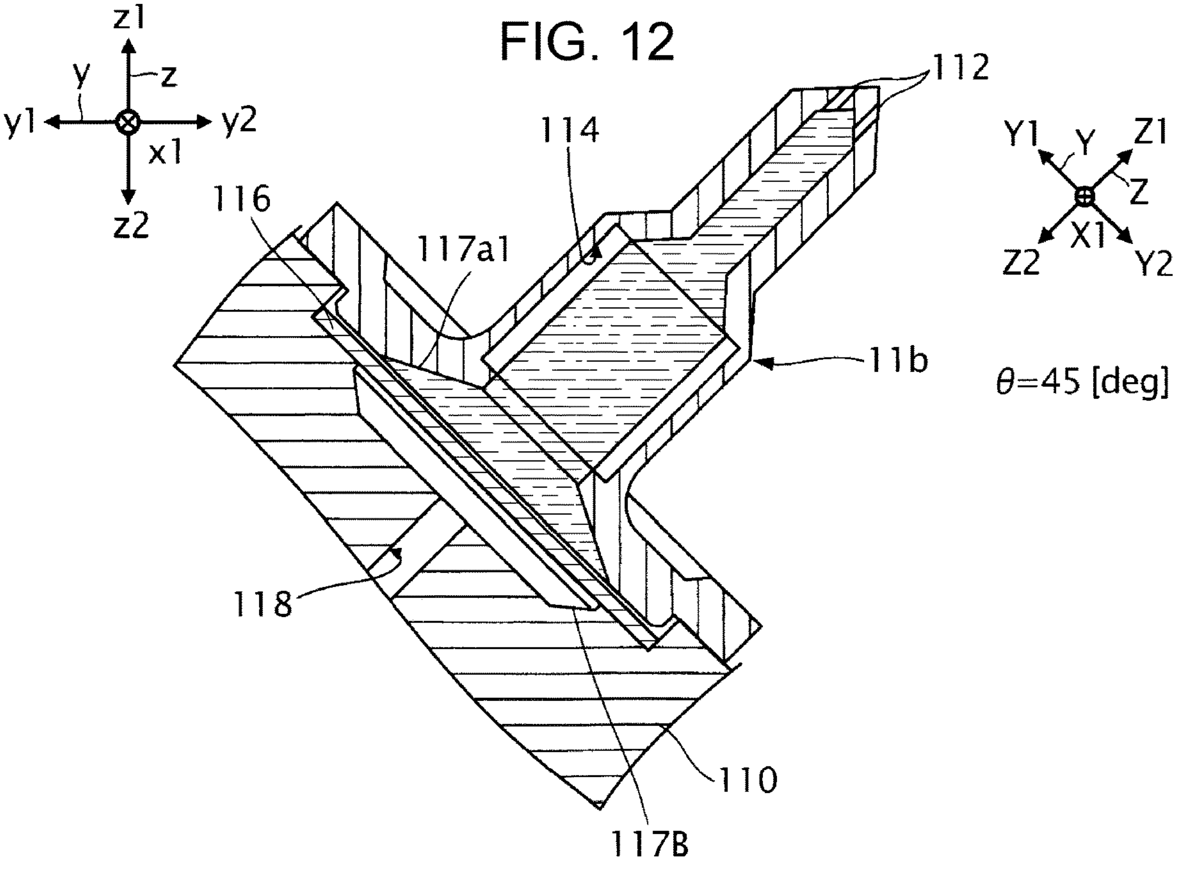
FIG. 12 is a view showing the state of the vicinity of the filter after the second circulation cleaning operation, in which the disposition angle is 45 degrees.

FIG. 10 is a view showing the state of the vicinity of the filter 116 at the time of the first circulation cleaning operation, in which the disposition angle θ is 45 degrees. FIG. 11 is a view showing the state of the vicinity of the filter 116 at the time of the second circulation cleaning operation, in which the disposition angle θ is 45 degrees. FIG. 12 is a view showing the state of the vicinity of the filter 116 after the second circulation cleaning operation, in which the disposition angle θ is 45 degrees.

In a stage before the first circulation cleaning operation, the state of the vicinity of the filter 116 is similar to the state of the vicinity of the filter 116 at the time of printing which is shown in FIG. 7. Specifically, the small air bubbles bb are present in the vicinity of the end portion of the width increase portion **117*a*1** in the Y1 direction.

Thereafter, the controller 90 performs the first circulation cleaning operation shown in FIG. 10. The first flow rate in the first circulation cleaning operation is lower than the second flow rate in the second circulation cleaning operation which corresponds to the circulation cleaning operation in the related art. Therefore, a force that moves the large air bubble Bu in the Z2 direction is weak in comparison with a state shown in FIG. 8 showing the circulation cleaning operation in the related art, and the buoyant force BF extends the large air bubble Bu up to the end portion in the width increase portion **117*a*1 in the Y1 direction. In addition, since the large air bubble Bu enters a state where the large air bubble Bu cannot pass through the filter 116 and is pressed against the filter 116, the large air bubble Bu is extended in a direction in which the filter 116** extends. As a result, the small air bubbles bb are absorbed by the large air bubble Bu, and the small air bubbles bb and the large air bubble Bu are integrated with each other to form the new large air bubble Bu.

The controller 90 performs the second circulation cleaning operation shown in FIG. 11 after performing the first circulation cleaning operation. In a state shown in FIG. 11, unlike the state shown in FIG. 8, there are no small air bubbles bb formed in the vicinity of the end portion of the width increase portion **117*a*1** in the Y1 direction.

The controller 90 causes, by means of the second circulation cleaning operation, the new large air bubble Bu shown in FIG. 11 to pass through the filter 116 and to flow out to the outside of the filter chamber 117 through the flow path 118 thereafter. As a result, as shown in FIG. 12, the small air bubbles bb do not remain in the vicinity of the end portion of the width increase portion **117*a*1 in the Y1 direction. In addition, a risk that the filter 116** may be clogged with the small air bubbles bb when a printing process is performed again is suppressed.

After the second circulation cleaning operation, the controller 90 performs a standby operation of stopping ink circulation, which is performed by the circulation mechanism 94, for a predetermined time. The predetermined time is at least 30 seconds, and is preferably 1 to 5 minutes. The predetermined time corresponds to a period in which the driving of the flow mechanism 943 is stopped. Since the controller 90 performs the standby operation, even when the small air bubbles bb are not completely removed and thus the small air bubbles bb adhere to a surface of the filter 116, the small air bubbles bb can move to a position above the width increase portion **117*a*1 in the vertical direction by means of a buoyant force. As a result, it is possible to prevent an increase in pressure loss that is caused when the filter 116 is clogged with the small air bubbles bb present in a gap at an outer peripheral end portion of the width increase portion 117*a*1**.

After the controller 90 performs the standby operation, a printing operation is performed. Alternatively, the controller 90 enters a state of waiting for the printing operation itself.

Hereinabove, the first circulation cleaning operation and the second circulation cleaning operation performed when the disposition angle θ is 45 degrees have been described with reference to FIGS. 10 to 12. Hereinafter, the first circulation cleaning operation and the second circulation cleaning operation performed when the disposition angle θ is another angle will be described with reference to FIGS. 13 to 20.

Figure 13:
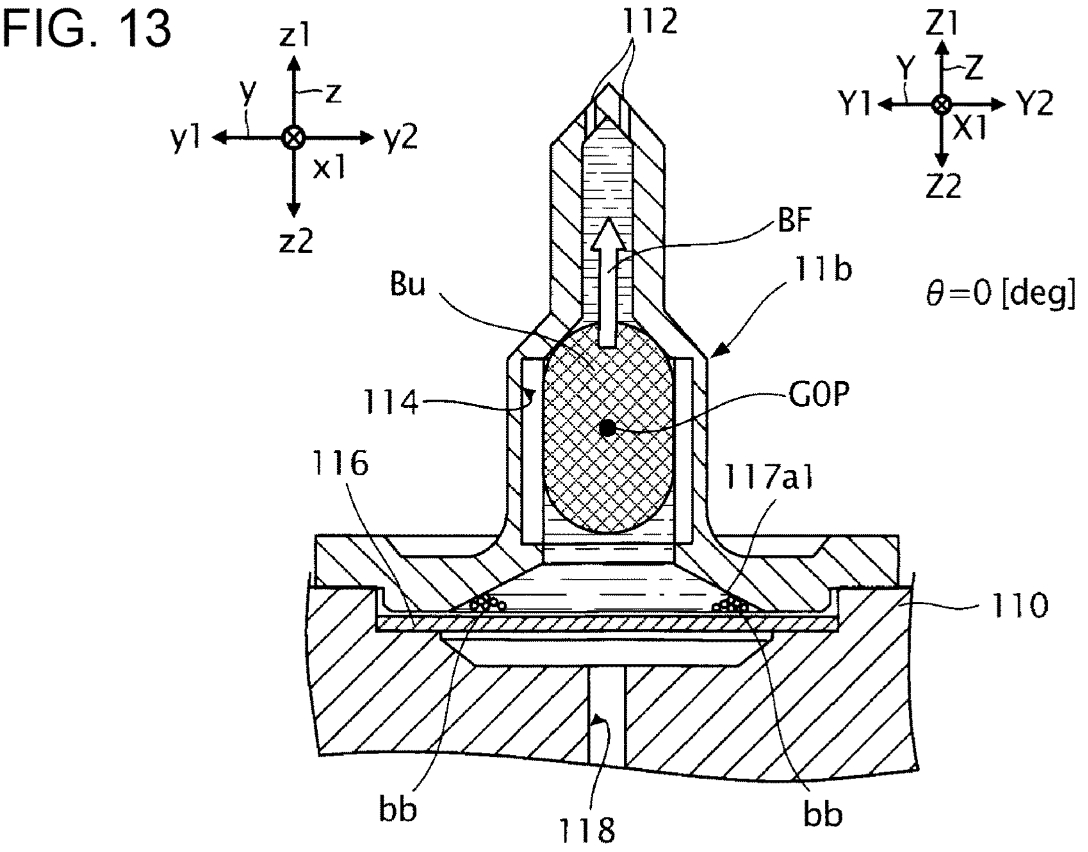
FIG. 13 is a view showing the state of the vicinity of the filter in a stage before the first circulation cleaning operation, in which the disposition angle is 0 degrees.
Figure 14:
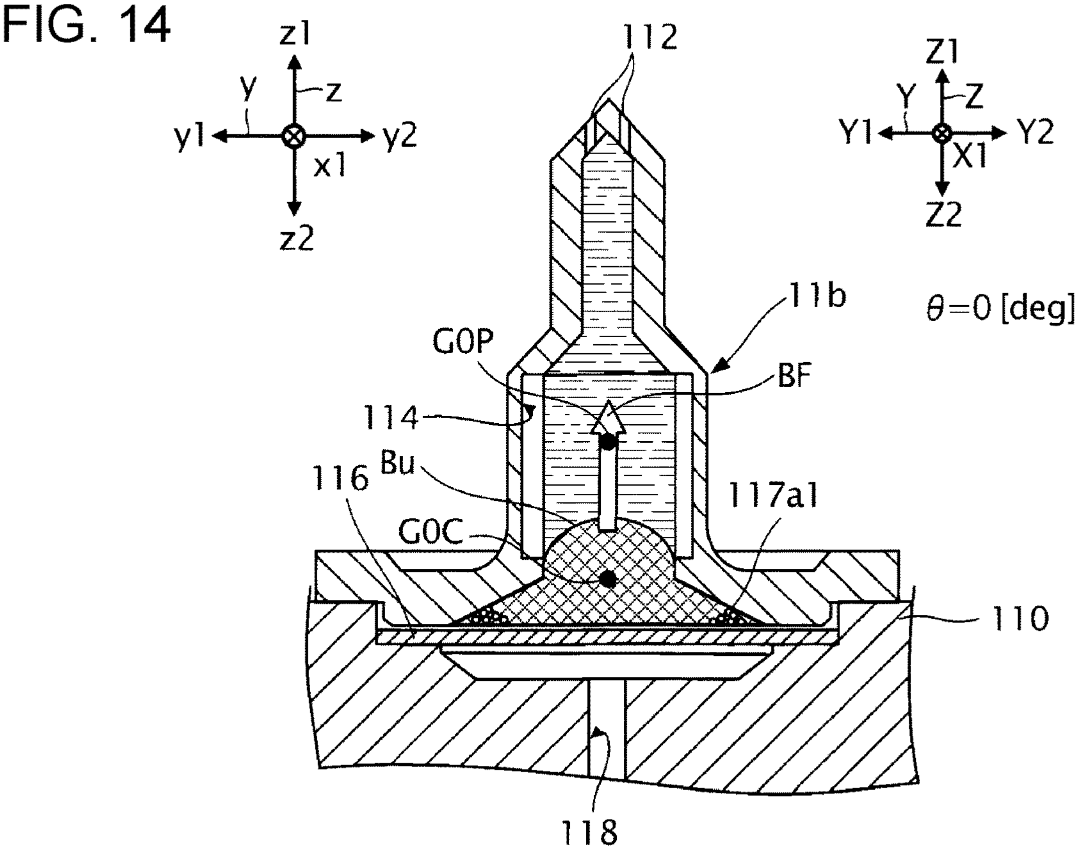
FIG. 14 is a view showing the state of the vicinity of the filter at the time of the first circulation cleaning operation, in which the disposition angle is 0 degrees.
Figure 15:
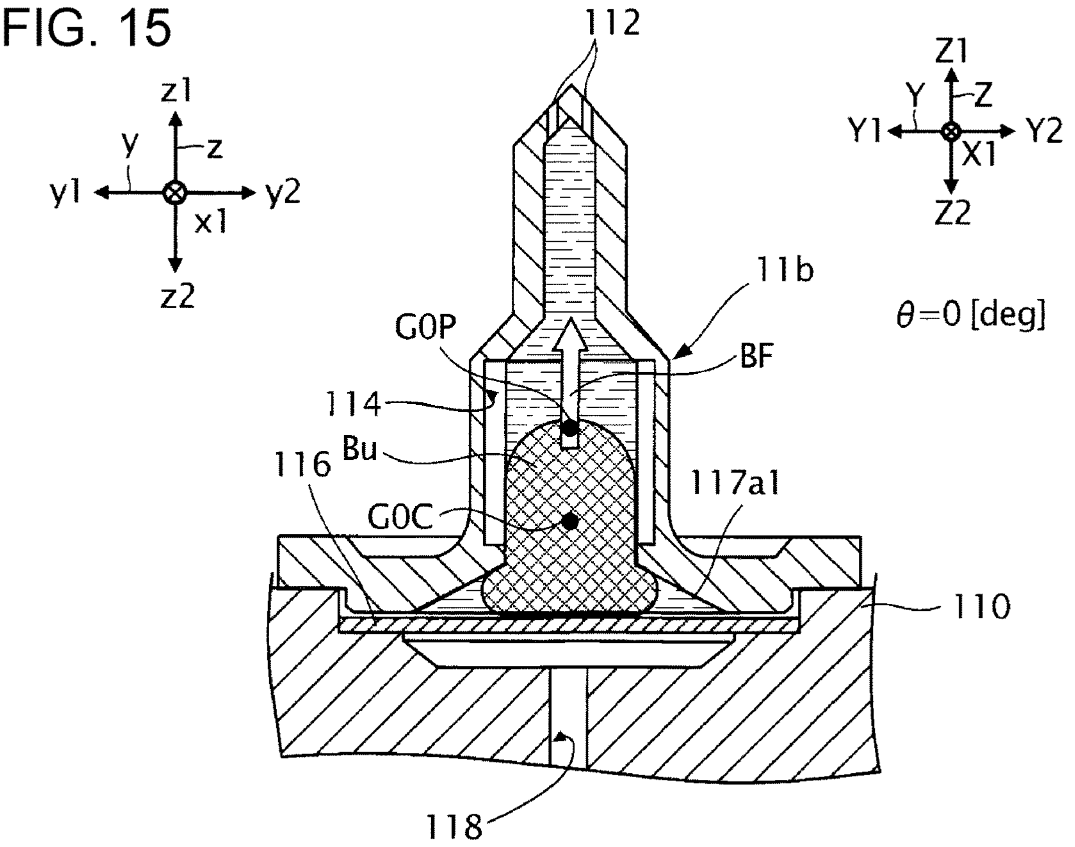
FIG. 15 is a view showing the state of the vicinity of the filter at the time of the second circulation cleaning operation, in which the disposition angle is 0 degrees.

FIG. 13 is a view showing the state of the vicinity of the filter 116 in a stage before the first circulation cleaning operation, in which the disposition angle θ is 0 degrees. FIG. 14 is a view showing the state of the vicinity of the filter 116 at the time of the first circulation cleaning operation, in which the disposition angle θ is 0 degrees. FIG. 15 is a view showing the state of the vicinity of the filter 116 at the time of the second circulation cleaning operation, in which the disposition angle θ is 0 degrees.

As shown in FIG. 13, the large air bubble Bu is positioned to be separated from the filter 116 in the z1 direction. In addition, the small air bubbles bb are present in the vicinity of the end portion of the width increase portion **117*a*1 in the Y1 direction and the vicinity of an end portion of the width increase portion 117*a*1** in the Y2 direction.

Thereafter, the controller 90 performs the first circulation cleaning operation shown in FIG. 14. At the time of the first circulation cleaning operation shown in FIG. 14, the large air bubble Bu needs to be extended up to the end portions of the width increase portion **117*a*1 so that the large air bubble Bu absorbs the small air bubbles bb. In an example shown in FIG. 14, ink flows in the Z2 direction at the first flow rate higher than a flow rate at the time of printing due to the first circulation cleaning operation. Therefore, the large air bubble Bu moves in the Z2 direction. However, the buoyant force BF in the z1 direction acts on the large air bubble Bu. In the example shown in FIG. 14, since the Z2 direction and the z1 direction are parallel to each other and are opposite directions, the buoyant force BF can be canceled out by the flow of the ink. In addition, in the case of circulation of ink at the first flow rate, the large air bubble Bu does not pass through the filter 116. Therefore, as shown in FIG. 14, the large air bubble Bu is extended up to the end portions of the width increase portion 117*a*1**.

The controller 90 performs the second circulation cleaning operation shown in FIG. 15 after performing the first circulation cleaning operation. At the time of the second circulation cleaning operation shown in FIG. 15, the large air bubble Bu needs to come into contact with the filter 116 so that the large air bubble Bu is discharged in the Z2 direction. In an example shown in FIG. 15, ink flows in the Z2 direction at the second flow rate higher than a flow rate at the time of the first circulation cleaning operation due to the second circulation cleaning operation. Therefore, the large air bubble Bu moves in the Z2 direction. However, the buoyant force BF in the z1 direction acts on the large air bubble Bu. In the example shown in FIG. 15, since the Z2 direction and the z1 direction are parallel to each other and are opposite directions, the buoyant force BF can be canceled out by the flow of the ink. As a result of movement of the large air bubble Bu in the Z2 direction, the large air bubble Bu comes into contact with the filter 116.

The controller 90 causes, by means of the second circulation cleaning operation, the new large air bubble Bu shown in FIG. 15 to pass through the filter 116 and to flow out to the outside of the filter chamber 117 through the flow path 118 thereafter. As a result, the small air bubbles bb do not remain in the vicinity of the end portion of the width increase portion 117*a*1 in the Y1 direction and the vicinity of the end portion of the width increase portion 117*a*1 in the Y2 direction. In addition, a risk that the filter 116 may be clogged with the small air bubbles bb when a printing process is performed again is suppressed.

The controller 90 performs the above-described standby operation after the second circulation cleaning operation.

Figure 16:
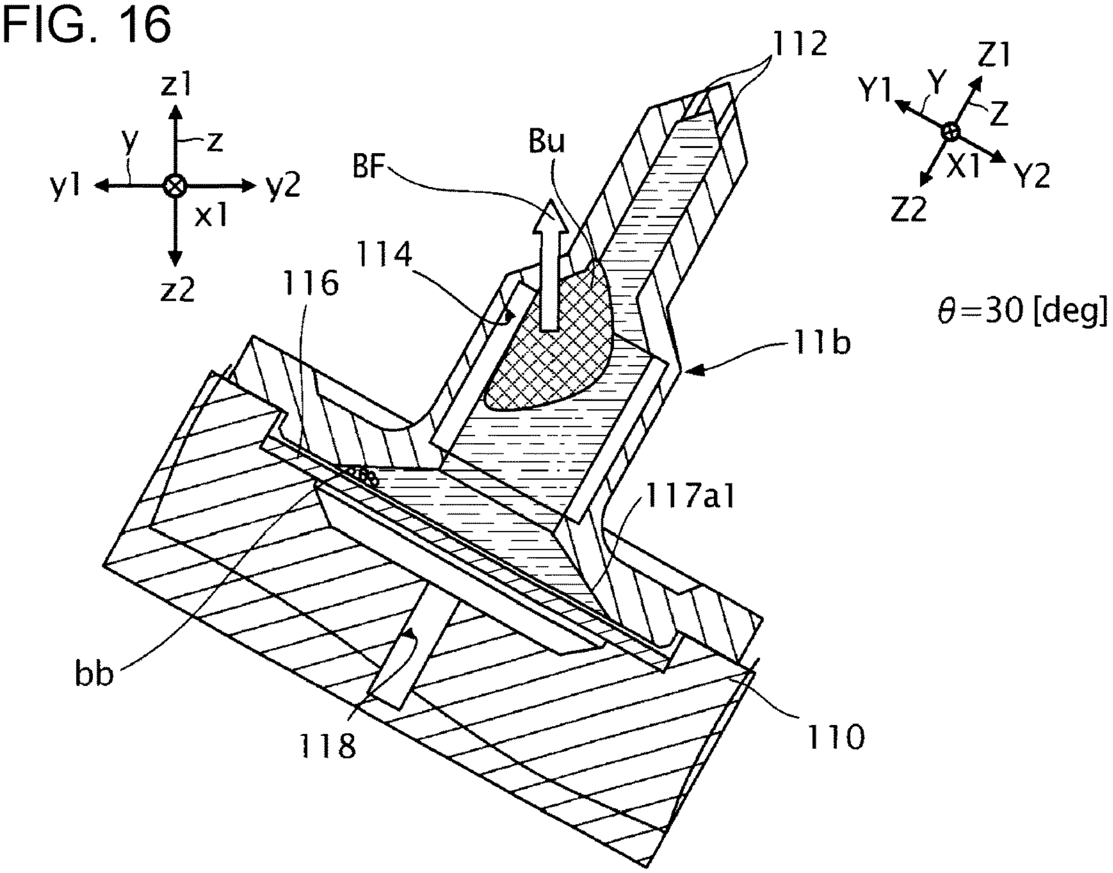
FIG. 16 is a view showing the state of the vicinity of the filter in a stage before the first circulation cleaning operation, in which the disposition angle is 30 degrees.
Figure 17:
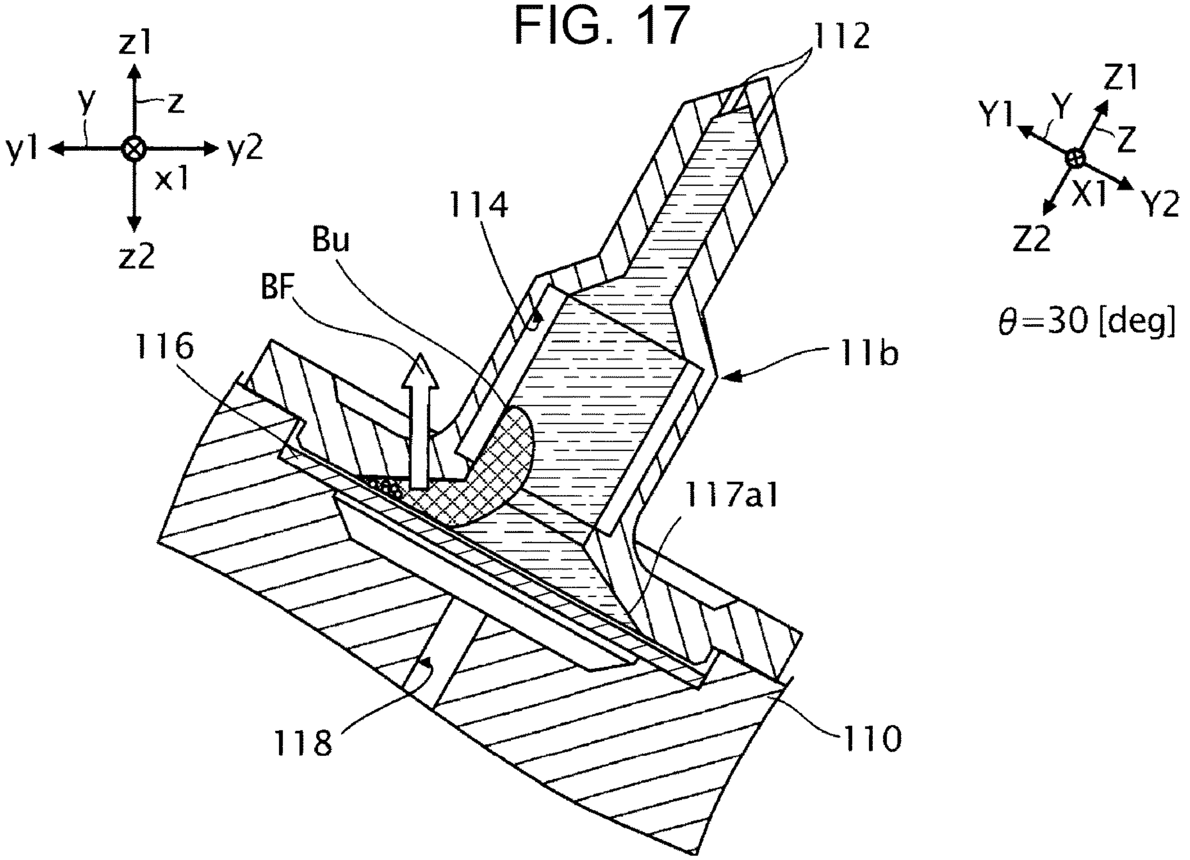
FIG. 17 is a view showing the state of the vicinity of the filter at the time of the first circulation cleaning operation, in which the disposition angle is 30 degrees.

FIG. 16 is a view showing the state of the vicinity of the filter 116 in a stage before the first circulation cleaning operation, in which the disposition angle θ is 30 degrees. FIG. 17 is a view showing the state of the vicinity of the filter 116 at the time of the first circulation cleaning operation, in which the disposition angle θ is 30 degrees.

In a state before the first circulation cleaning operation, the state of the vicinity of the filter 116 is similar to the state of the vicinity of the filter 116 at the time of printing which is shown in FIG. 7. Specifically, the small air bubbles bb are formed in the vicinity of the end portion of the width increase portion 117*a*1 in the Y1 direction.

Thereafter, the controller 90 performs the first circulation cleaning operation shown in FIG. 17. As with the first circulation cleaning operation that is performed when the disposition angle θ is 45 degrees and that is shown in FIG. 10, the buoyant force BF extends the large air bubble Bu up to the end portion in the width increase portion 117*a*1 in the Y1 direction. Furthermore, since the large air bubble Bu enters a state where the large air bubble Bu cannot pass through the filter 116 and is pressed against the filter 116, the large air bubble Bu is extended up to the end portion in the Y1 direction. As a result, the small air bubbles bb are absorbed by the large air bubble Bu, and the small air bubbles bb and the large air bubble Bu are integrated with each other to form the new large air bubble Bu. Note that, in comparison with the first circulation cleaning operation that is performed when the disposition angle θ is 0 degrees and that is shown in FIG. 14, the buoyant force BF in the Z1 direction is not likely to act on the large air bubble Bu shown in FIG. 17 and thus it is easy to move the large air bubble Bu in the Z2 direction toward the filter 116. Furthermore, the large air bubble Bu moved to the filter 116 can be easily extended toward the end portion in the Y1 direction by a buoyant force in comparison with a case where the disposition angle θ is 0 degrees. Therefore, the first flow rate related to a case where the disposition angle θ is 30 degrees is lower than the first flow rate related to a case where the disposition angle θ is 0 degrees. Meanwhile, in comparison with the first circulation cleaning operation that is performed when the disposition angle θ is 45 degrees and that is shown in FIG. 10, the buoyant force BF in the Z1 direction is likely to act on the large air bubble Bu shown in FIG. 17. Therefore, the first flow rate related to a case where the disposition angle θ is 30 degrees is higher than the first flow rate related to a case where the disposition angle θ is 45 degrees.

The controller 90 performs the second circulation cleaning operation after performing the first circulation cleaning operation. Since the second circulation cleaning operation that is performed when the disposition angle θ is 30 degrees is the same as the second circulation cleaning operation that is performed when the disposition angle θ is 45 degrees and that is shown in FIG. 11, the second circulation cleaning operation that is performed when the disposition angle θ is 30 degrees is not shown in the drawings. Note that when the disposition angle θ is 30 degrees, a force that separates an end portion of the large air bubble Bu in the Y2 direction from the filter 116 acts on the end portion of the large air bubble Bu in the Y2 direction due to the buoyant force BF at the time of the second circulation cleaning operation in comparison with a case where the disposition angle θ is 0 degrees. Therefore, the area of contact between the large air bubble Bu and the filter 116 is small and thus the large air bubble Bu is less likely to pass through the filter 116. Therefore, it is preferable that the second flow rate related to a case where the disposition angle θ is 30 degrees is higher than the second flow rate related to a case where the disposition angle θ is 0 degrees.

The controller 90 causes, by means of the second circulation cleaning operation, the new large air bubble Bu to pass through the filter 116 and to flow out to the outside of the filter chamber 117 through the flow path 118 thereafter. As a result, the small air bubbles bb do not remain in the vicinity of the end portion of the width increase portion 117*a*1 in the Y1 direction. In addition, a risk that the filter 116 may be clogged with the small air bubbles bb when a printing process is performed again is suppressed.

The controller 90 performs the above-described standby operation after the second circulation cleaning operation.

Figure 18:
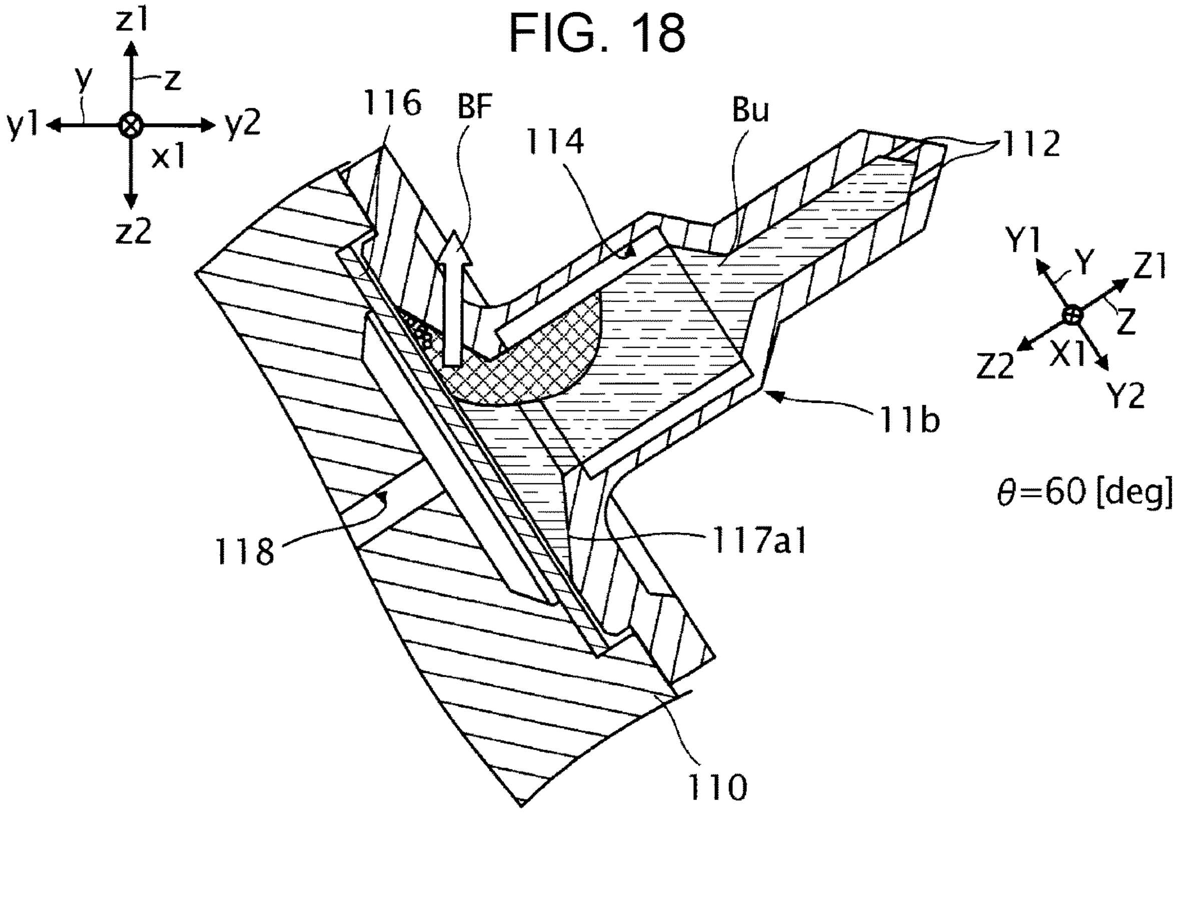
FIG. 18 is a view showing the state of the vicinity of the filter in a stage before the first circulation cleaning operation, in which the disposition angle is 60 degrees.
Figure 19:
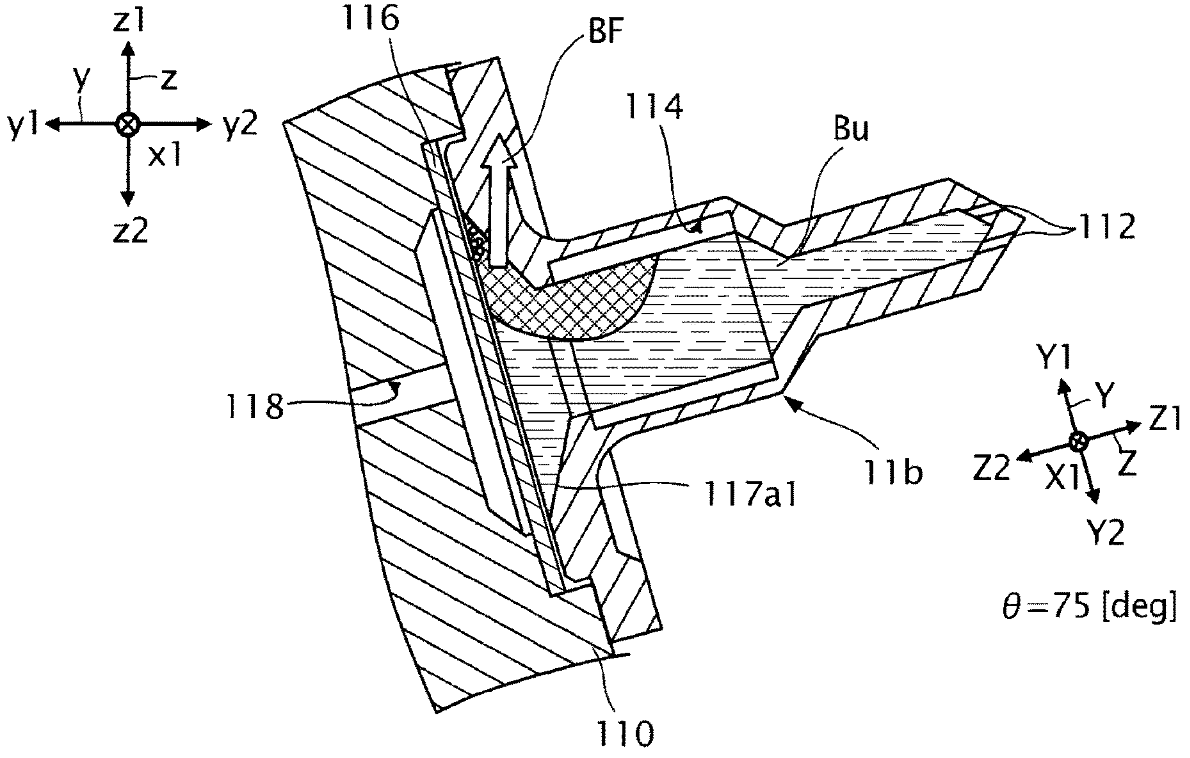
FIG. 19 is a view showing the state of the vicinity of the filter in a stage before the first circulation cleaning operation, in which the disposition angle is 75 degrees.
Figure 20:
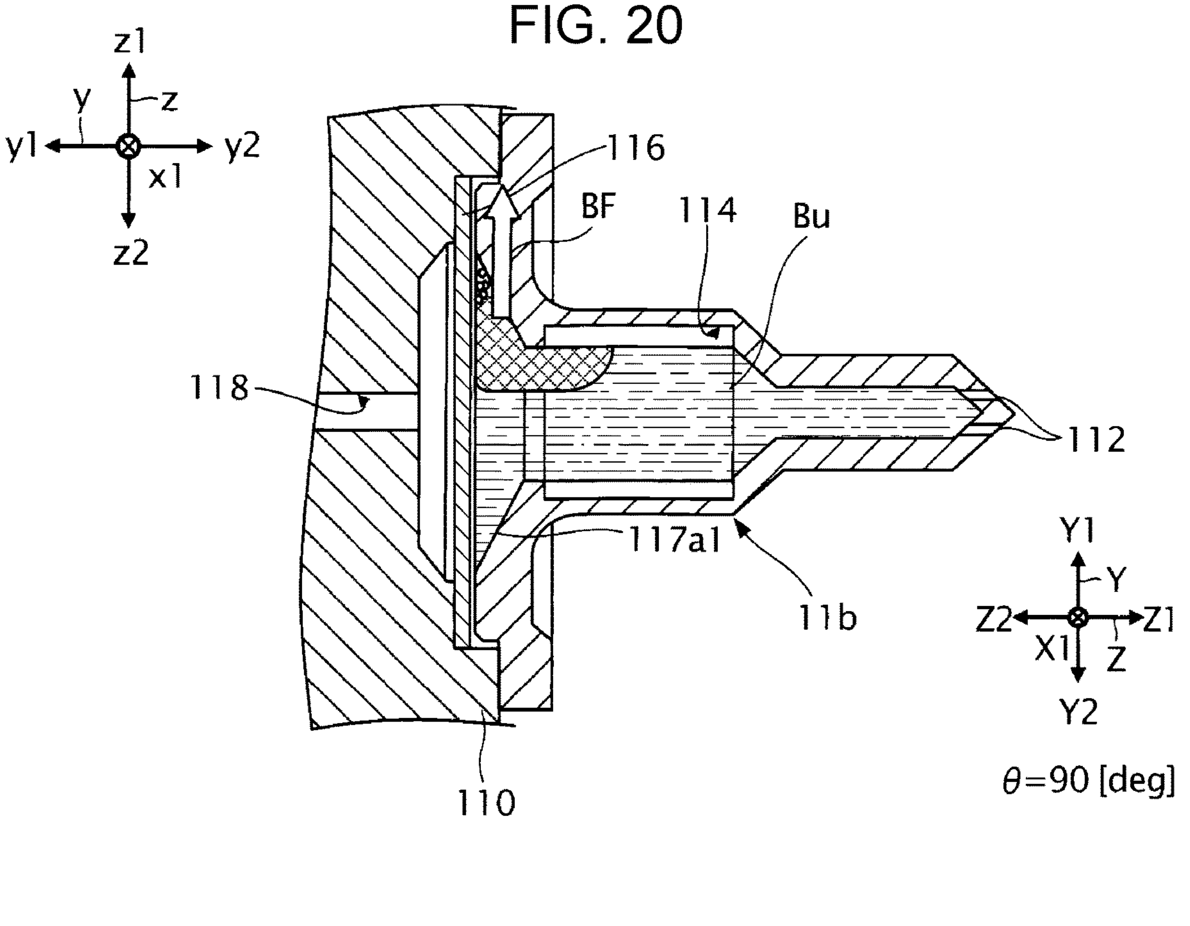
FIG. 20 is a view showing the state of the vicinity of the filter in a stage before the first circulation cleaning operation, in which the disposition angle is 90 degrees.

FIG. 18 is a view showing the state of the vicinity of the filter 116 in a stage before the first circulation cleaning operation, in which the disposition angle θ is 60 degrees. FIG. 19 is a view showing the state of the vicinity of the filter 116 in a stage before the first circulation cleaning operation, in which the disposition angle θ is 75 degrees. FIG. 20 is a view showing the state of the vicinity of the filter 116 in a stage before the first circulation cleaning operation, in which the disposition angle θ is 90 degrees.

In the case of the disposition angles θ as above, in a stage before the first circulation cleaning operation, the buoyant force BF extends the large air bubble Bu up to the end portion in the width increase portion 117*a*1 in the Y1 direction. That is, the small air bubbles bb are integrated with the large air bubble Bu in advance even when the controller 90 does not perform the first circulation cleaning operation. Therefore, in the case of the disposition angles θ as above, the controller 90 omits the first circulation cleaning operation and performs only the second circulation cleaning operation. Since the second circulation cleaning operation that is performed in the case of the disposition angles θ as above is the same as the second circulation cleaning operation that is performed when the disposition angle θ is 45 degrees and that is shown in FIG. 11 except the disposition angle θ, the second circulation cleaning operation that is performed in the case of the disposition angles θ as above is not shown in the drawings.

The controller 90 causes, by means of the second circulation cleaning operation, the large air bubble Bu to pass through the filter 116 and to flow out to the outside of the filter chamber 117 through the flow path 118 thereafter. As a result, the small air bubbles bb do not remain in the vicinity of the end portion of the width increase portion 117*a*1 in the Y1 direction. In addition, a risk that the filter 116 may be clogged with the small air bubbles bb when a printing process is performed again is suppressed.

The controller 90 performs the above-described standby operation after the second circulation cleaning operation.

1-6: Examples of First Flow Rate and Second Flow Rate

FIG. 21 is a diagram showing examples of the first flow rate of ink circulated in the first circulation cleaning operation and the second flow rate of ink circulated in the second circulation cleaning operation. A table Ti shown in FIG. 21 has records 160_1 to 160_7. The storage section 91 stores the table Ti.

The table Ti shows examples of specific numerical values of the first flow rate and the second flow rate for each of the disposition angles θ of 0 degrees, 15 degrees, 30 degrees, 45 degrees, 60 degrees, 75 degrees, and 90 degrees. The unit of the first flow rate and the second flow rate shown in FIG. 16 is [g/sec], that is, the first flow rate and the second flow rate are so-called mass flow rates.

The record 160_1 indicates that the first flow rate is 1.2 [g/sec] and the second flow rate is 1.5 [g/sec] when the disposition angle θ is 0 degrees. The record 160_2 indicates that the first flow rate is 1.15 [g/sec] and the second flow rate is 1.55 [g/sec] when the disposition angle θ is 15 degrees. The record 160_3 indicates that the first flow rate is 1.1 [g/sec] and the second flow rate is 1.6 [g/sec] when the disposition angle θ is 30 degrees. The record 160_4 indicates that the first flow rate is 1.0 [g/sec] and the second flow rate is 1.7 [g/sec] when the disposition angle θ is 45 degrees. The record 160_5 indicates that the first flow rate is 0 [g/sec] and the second flow rate is 2.0 [g/sec] when the disposition angle θ is 60 degrees. The record 160_6 indicates that the first flow rate is 0 [g/sec] and the second flow rate is 1.5 [g/sec] when the disposition angle θ is 75 degrees. The record 160_7 indicates that the first flow rate is 0 [g/sec] and the second flow rate is 1.5 [g/sec] when the disposition angle θ is 90 degrees.

Regarding the first flow rate, the first flow rate decreases as the disposition angle θ increases in a range of 0 degrees to 45 degrees in the table Ti. This is because the larger the disposition angle θ is, the smaller the degree to which movement of ink in the Z2 direction is canceled out by the buoyant force BF is, the greater a component of the buoyant force BF in the Y1 direction is, and the more the large air bubble Bu is likely to be extended up to the end portion of the width increase portion **117*a*1** in the Y1 direction. When the disposition angle θ is 0 degrees, the first flow rate is 1.2 [g/sec].

When the disposition angle θ is 0 degrees, the small air bubbles bb may stay at the outer peripheral end portion of the width increase portion **117*a*1. In such a case, the controller 90 performs the first circulation cleaning operation in which the first flow rate is set to 1.2 [g/sec]. When the first circulation cleaning operation is to be performed with the disposition angle θ being 0 degrees, since the large air bubble Bu needs to be pressed against the filter 116 and extended in a horizontal direction such that the large air bubble Bu reaches the outer peripheral end portion of the width increase portion 117*a*1**, it is preferable that the first flow rate is high in comparison with a case where the disposition angle θ is larger than 0 degrees (for example, a case where the disposition angle θ is 15 degrees or 30 degrees).

When the disposition angle θ is 0 degrees, the first flow rate may be set to 0 [g/sec]. This is because the small air bubbles bb at the outer peripheral end portion of the width increase portion **117*a*1 may naturally rise up to the air bubble chamber 114 due to the influence of a buoyant force when the disposition angle θ is 0 degrees although whether or not the small air bubbles bb rise in such a manner depends on the shape of the width increase portion 117*a*1**.

In addition, as described above, when the disposition angle θ is 60 degrees, 75 degrees, or 90 degrees, the controller 90 does not need to perform the first circulation cleaning operation.

Regarding the second flow rate, the degree to which the large air bubble Bu is discharged changes as the disposition angle θ increases in the table Ti. Therefore, as shown in FIG. 21, the second flow rate monotonically increases as the disposition angle θ increases in a range of 0 degrees to 60 degrees, and is the same as a value in the case of the disposition angle θ of 0 degrees when the disposition angle θ is 75 degrees or 90 degrees. This is because, when the disposition angle θ is equal to or larger than 75 degrees, the buoyant force BF acting on the large air bubble Bu is less likely to act against a direction in which a force pressing the large air bubble Bu against the filter 116 with ink flowing in the Z2 direction acts in comparison with a case where the disposition angle θ is smaller than 75 degrees.

Note that the numerical values shown in the table Ti are merely examples. For example, at least one of the first flow rate and the second flow rate related to a case where the disposition angle θ is 15 degrees and the at least one of the first flow rate and the second flow rate related to a case where the disposition angle θ is 30 degrees may be the same as each other. In addition, the numerical values shown in Table Ti may be changed to different numerical values in accordance with the viscosity of ink. In addition, for example, the first flow rate related to a case where the disposition angle θ is 30 degrees and the first flow rate related to a case where the disposition angle θ is 0 degrees may be the same as each other.

In addition, it is preferable that the circulation cleaning process including the first circulation cleaning operation and the second circulation cleaning operation shown in Table Ti is performed periodically. In this case, it is more preferable that the larger the disposition angle θ is, the shorter an interval between periodically performed circulation cleaning operations is.

1-7: Circulation Cleaning Process

The controller 90 performs the circulation cleaning process for the head 10_1, the circulation cleaning process for the head 10_2, and the circulation cleaning process for the head 10_3 in parallel. For example, when the controller 90 is a multiprocessor and includes three or more processors, each of the three processors of the controller 90 may perform the circulation cleaning process for any of the heads 10_1 to 10_3. When the controller 90 includes one processor, the controller 90 performs the circulation cleaning process for the head 10_1, the circulation cleaning process for the head 10_2, and the circulation cleaning process for the head 10_3 while switching between the processes each time a certain period elapses. The circulation cleaning process for the head 10_1 will be described with reference to FIG. 22. Note that description about the circulation cleaning process for the head 10_2 and the circulation cleaning process for the head 10_3 will be omitted since the circulation cleaning process for the head 10_2 and the circulation cleaning process for the head 10_3 are substantially the same as the circulation cleaning process for the head 10_1.

Figure 22:
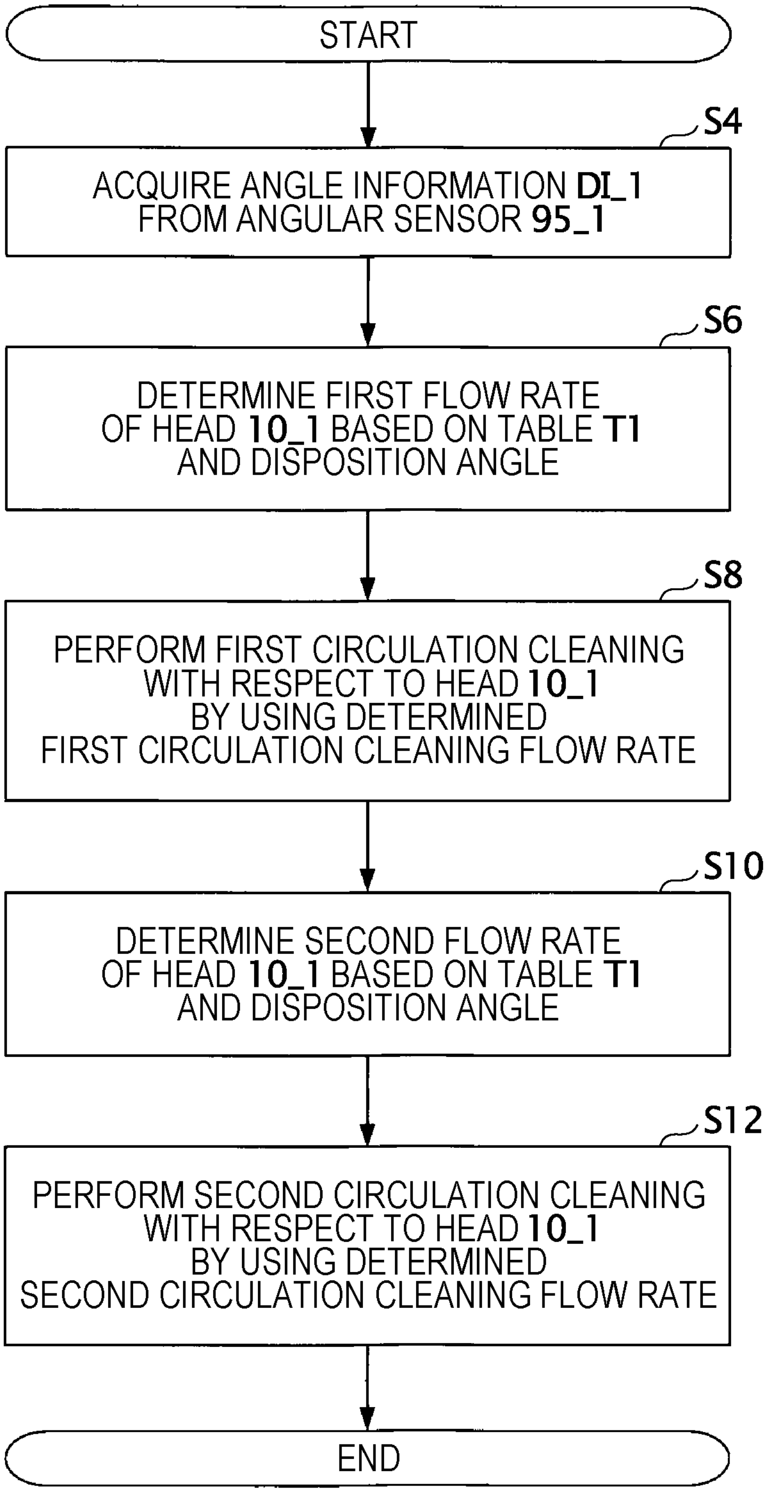
FIG. 22 is a flowchart showing the contents of a circulation cleaning process for a head.

FIG. 22 is a flowchart showing the contents of the circulation cleaning process for the head 10_1.

In step S4, the controller 90 acquires the angle information DI_1 from the angular sensor 95_1.

In addition, in step S6, the controller 90 determines the first flow rate of the head 10_1 based on the table Ti and the disposition angle θ indicated by the angle information DI_1. More specifically, the controller 90 determines whether or not the disposition angle θ1 indicated by the angle information DI_1 is registered in the table Ti. When the disposition angle θ1 indicated by the angle information DI_1 is registered in the table Ti, the controller 90 determines the first flow rate corresponding to the registered disposition angle θ as the first flow rate of the head 10_1. Meanwhile, when the disposition angle θ1 indicated by the angle information DI_1 is not registered in the table Ti, the controller 90 performs an interpolation process based on the first flow rate corresponding to one of the plurality of disposition angles θ registered in the table Ti that is close to the disposition angle θ1 indicated by the angle information DI_1 and determines the result thereof as the first flow rate of the head 10_1. Examples of the interpolation process include linear interpolation, cubic spline interpolation, and the like.

After the process in step S6 is finished, in step S8, the controller 90 performs the first circulation cleaning operation with respect to the plurality of heads 10_1 of the head module 3_1 by using the determined first flow rate. When the first flow rate corresponding to the disposition angle θ1 indicated by the angle information DI_1 is 0 [g/sec], the first circulation cleaning operation is omitted and the second circulation cleaning operation is performed as the circulation cleaning process.

In addition, in step S10, the controller 90 determines the second flow rate of the head 10_1 based on the table Ti and the disposition angle θ1 indicated by the angle information DI_1. More specifically, the controller 90 determines whether or not the disposition angle θ1 indicated by the angle information DI_1 is registered in the table Ti. When the disposition angle θ1 indicated by the angle information DI_1 is registered in the table Ti, the controller 90 determines the second flow rate corresponding to the registered disposition angle θ as the second flow rate of the head 10_1. Meanwhile, when the disposition angle θ1 indicated by the angle information DI_1 is not registered in the table Ti, the controller 90 performs an interpolation process based on the second flow rate corresponding to one of the plurality of disposition angles θ registered in the table Ti that is close to the disposition angle θ1 indicated by the angle information DI_1 and determines the result thereof as the second flow rate of the head 10_1. Examples of the interpolation process include linear interpolation, cubic spline interpolation, and the like.

After the process in step S10 is finished, in step S12, the controller 90 performs the second circulation cleaning operation with respect to the plurality of heads 10_1 of the head module 3_1 by using the determined second flow rate.

After the process in step S12 is finished, the controller 90 terminates a series of processes shown in FIG. 17.

Note that the controller 90 may sequentially perform the circulation cleaning process for the head 10_1, the circulation cleaning process for the head 10_2, and the circulation cleaning process for the head 10_3.

Hereinafter, specific examples of the circulation cleaning process will be described.

For example, the disposition angle θ1 of the head 10_1 indicated by the angle information DI_1 may be equal to or larger than 5 degrees and equal to or smaller than 45 degrees. In this case, for example, the disposition angle θ1 of the head 10_1 is substantially 30 degrees. The expression "being substantially 30 degrees" means not only being completely 30 degrees but also being able to be considered as 30 degrees in consideration of manufacturing errors. Here, the Z2 direction, which is a direction in which ink passing through the filter 116 provided in the head 10_1 flows, intersects the z2 direction, which is the gravity direction. The disposition angle θ described above is an angle formed by the Z2 direction of the head 10_1 and the z2 direction. Note that the direction in which ink passing through the filter 116 in the head 10_1 flows is an example of a "first direction". The disposition angle θ1 of the head 10_1 is an example of a "first angle". In addition, the head 10_1 is an example of a "first liquid ejecting head". The filter 116 provided in the head 10_1 is an example of a "first filter".

The controller 90 performs the above-described circulation cleaning process with respect to the head 10_1. The circulation cleaning process is an example of the above-described "first circulation cleaning process". Note that when the circulation cleaning process of performing the second circulation cleaning operation after the first circulation cleaning operation is to be performed, the disposition angle θ1 is preferably equal to or larger than 10 degrees and is more preferably equal to or larger than 15 degrees.

In addition, the disposition angle θ2 of the head 10_2 indicated by the angle information DI_2 may be larger than the first angle of the head 10_1 and may be equal to or smaller than 45 degrees. In this case, for example, the disposition angle θ2 of the head 10_2 is substantially 45 degrees. The expression "being substantially 45 degrees" means not only being completely 45 degrees but also being able to be considered as 45 degrees in consideration of manufacturing errors. Here, the Z2 direction, which is a direction in which ink passing through the filter 116 provided in the head 10_2 flows, intersects the z2 direction, which is the gravity direction. The disposition angle θ2 described above is an angle formed by the Z2 direction of the head 10_2 and the z2 direction. Note that the direction in which ink passing through the filter 116 in the head 10_2 flows is an example of a "second direction". The disposition angle θ2 of the head 10_2 is an example of a "second angle". In addition, the head 10_2 is an example of a "second liquid ejecting head". The filter 116 provided in the head 10_2 is an example of a "second filter".

The controller 90 performs the above-described circulation cleaning process with respect to the head 10_2. As is obvious from the table Ti shown in FIG. 21, the first flow rate in the circulation cleaning process performed with respect to the head 10_2 is lower than the first flow rate in the circulation cleaning process performed with respect to the head 10_1. In addition, the second flow rate in the circulation cleaning process performed with respect to the head 10_2 is higher than the second flow rate in the circulation cleaning process performed with respect to the head 10_1.

In addition, the disposition angle θ3 of the head 10_3 indicated by the angle information DI_3 may be substantially 0 degrees. The expression "being substantially 0 degrees" means not only being completely 0 degrees but also being able to be considered as 0 degrees in consideration of manufacturing errors. For example, "an angle of substantially 0 degrees" also means an angle in a range of 0 to 3 degrees. Here, the Z2 direction, which is a direction in which ink passing through the filter 116 provided in the head 10_3 flows, intersects the z2 direction, which is the gravity direction. The disposition angle θ3 described above is an angle formed by the Z2 direction of the head 10_3 and the z2 direction. Note that the direction in which ink passing through the filter 116 in the head 10_3 flows when the disposition angle θ3 is substantially 0 degrees is an example of a "third direction". The disposition angle θ of the head 10_3 related to a case where the disposition angle θ3 is substantially 0 degrees is an example of a "third angle". In addition, the head 10_3 related to a case where the disposition angle θ3 is substantially 0 degrees is an example of a "third liquid ejecting head". The filter 116 provided in the head 10_3 related to a case where the disposition angle θ3 is substantially 0 degrees is an example of a "third filter".

The controller 90 performs the above-described circulation cleaning process with respect to the head 10_3. As is obvious from the table Ti shown in FIG. 21, the first flow rate in the circulation cleaning process performed with respect to the head 10_1 is lower than the first flow rate in the circulation cleaning process performed with respect to the head 10_3. In addition, the second flow rate in the circulation cleaning process performed with respect to the head 10_1 is higher than the second flow rate in the circulation cleaning process performed with respect to the head 10_3. Note that, when the controller 90 performs the above-described circulation cleaning process with respect to the head 10_3, the controller 90 may perform the second circulation cleaning operation without performing the first circulation cleaning operation. The circulation cleaning process in such a case is an example of a "second circulation cleaning process".

In addition, the disposition angle θ3 of the head 10_3 indicated by the angle information DI_3 may be larger than 45 degrees. In this case, for example, the disposition angle θ3 of the head 10_3 is substantially 60 degrees. The expression "being substantially 60 degrees" means not only being completely 60 degrees but also being able to be considered as 60 degrees in consideration of manufacturing errors. Here, the Z2 direction, which is a direction in which ink passing through the filter 116 provided in the head 10_3 flows, intersects the z2 direction, which is the gravity direction. The disposition angle θ3 described above is an angle formed by the Z2 direction of the head 10_3 and the z2 direction. Note that the direction in which ink passing through the filter 116 in the head 10_3 flows when the disposition angle θ3 is larger than 45 degrees is an example of a "fourth direction". The disposition angle θ3 of the head 10_3 related to a case where the disposition angle θ3 is equal to or larger than 45 degrees is an example of a "fourth angle". In addition, the head 10_3 related to a case where the disposition angle θ3 is larger than 45 degrees is an example of a "fourth liquid ejecting head". The filter 116 provided in the head 10_3 related to a case where the disposition angle θ3 is larger than 45 degrees is an example of a "fourth filter".

Note that, when the controller 90 performs the above-described circulation cleaning process with respect to the head 10_3 in a case where the disposition angle θ3 is larger than 45 degrees, the controller 90 performs the second circulation cleaning operation without performing the first circulation cleaning operation. The circulation cleaning process in such a case is an example of the "second circulation cleaning process". When the second circulation cleaning process is to be performed, the disposition angle θ3 of the head 10_3 is preferably larger than 50 degrees.

1-8: Effect of First Embodiment

As described above, the liquid ejecting apparatus 100 according to the present embodiment includes one or more heads 10 serving as liquid ejecting heads, the storage portions 93 serving as liquid storage portions, the circulation mechanisms 94, and the controller 90. The head 10 includes the filter 116 provided in the middle of a flow path through which liquid is supplied to a plurality of the nozzles N for ejection of the liquid. The storage portion 93 stores the liquid to be supplied to the head 10. The circulation mechanism 94 circulates the liquid between the head 10 and the storage portion 93. The controller 90 controls the circulation mechanism 94. The one or more heads 10 include the head 10_1 serving as a first liquid ejecting head that includes a first filter as the filter 116. The controller 90 performs, with respect to the head 10_1, a first circulation cleaning process in which a first circulation cleaning operation is performed as a first circulation operation of circulating the liquid at a first flow rate and then a second circulation cleaning operation is performed as a second circulation operation of circulating the liquid at a second flow rate higher than the first flow rate.

Therefore, in the case of the liquid ejecting apparatus 100, air bubbles can be appropriately discharged from the upstream chamber 117A. More specifically, regarding the liquid ejecting apparatus 100, the large air bubble Bu and the small air bubbles bb in the head 10_1 are integrated with each other by means of the first circulation operation of circulating the liquid at the first flow rate which is relatively low. Thereafter, regarding the liquid ejecting apparatus 100, a new large air bubble Bu obtained through integration is caused to pass through the first filter by means of the second circulation operation of circulating the liquid at the second flow rate which is relatively high, so that the large air bubble Bu is discharged from the head 10_1. As a result, regarding the liquid ejecting apparatus 100, it is possible to restrain the small air bubbles bb from remaining in the width increase portion 117*a*1 after the first circulation cleaning process, the width increase portion 117*a*1 being provided upstream of the first filter.

In addition, in the liquid ejecting apparatus 100 according to the present embodiment, the first flow rate is a flow rate at which an air bubble of which the size is equal to or greater than a predetermined size does not pass through the filter 116. The second flow rate is a flow rate at which an air bubble of which the size is equal to or greater than the predetermined size passes through the filter 116.

Therefore, regarding the liquid ejecting apparatus 100, the small air bubbles bb are caused to remain in the width increase portion 117*a*1 at the time of the first circulation cleaning operation and the small air bubbles bb are integrated with the large air bubble Bu to a higher degree, so that a new large air bubble Bu obtained through integration can be discharged from the head 10_1 by means of the second circulation cleaning operation.

In addition, in the liquid ejecting apparatus 100 according to the present embodiment, the first flow rate is higher than the maximum flow rate of the liquid passing through the filter 116 during printing performed by the head 10 serving as the liquid ejecting head.

Therefore, regarding the liquid ejecting apparatus 100, the large air bubble Bu and the small air bubbles bb in the head 10_1 can be integrated with each other by means of the first circulation cleaning operation of circulating liquid at the first flow rate at which an amount of ink larger than the amount of circulation during printing or during a printing standby period flows.

In addition, in the liquid ejecting apparatus 100 according to the present embodiment, the controller 90 stops, in the first circulation cleaning process, circulation of the liquid, which is performed by the circulation mechanism 94, for a predetermined time after the second circulation cleaning operation is performed.

Therefore, even when the small air bubbles bb adhere to a surface of the filter 116, the air bubbles are moved vertically upward from the filter 116 by a buoyant force. As a result, regarding the liquid ejecting apparatus 100, the small air bubbles bb adhering to the surface of the filter 116 can be removed. In addition, regarding the liquid ejecting apparatus 100, it is possible to prevent an increase in pressure loss that is caused when the filter 116 is clogged with the small air bubbles bb.

In addition, in the liquid ejecting apparatus 100 according to the present embodiment, a first direction, which is a direction in which the liquid passing through the first filter flows, and a gravity direction intersect each other.

Therefore, regarding the liquid ejecting apparatus 100, the small air bubbles bb that stay at the width increase portion 117_a_1 since the first direction and the gravity direction intersect each other can be removed, the width increase portion 117_a_1 being provided upstream of the filter 116.

In addition, in the liquid ejecting apparatus 100 according to the present embodiment, a first angle, which is an angle formed by the first direction and the gravity direction, is equal to or smaller than 45 degrees.

For example, there is a case where the filter 116 cannot be disposed horizontally since it is necessary to tilt the head 10 of the liquid ejecting apparatus 100 in accordance with a medium transport direction. Regarding the liquid ejecting apparatus 100, the small air bubbles bb that stay at the width increase portion 117_a_1 since the filter 116 cannot be disposed horizontally can be removed, the width increase portion 117_a_1 being provided upstream of the filter 116.

In addition, in the liquid ejecting apparatus 100 according to the present embodiment, the first angle is equal to or larger than 5 degrees.

For example, there is a case where the filter 116 cannot be disposed horizontally since it is necessary to tilt the head 10 of the liquid ejecting apparatus 100 in accordance with a medium transport direction. Regarding the liquid ejecting apparatus 100, the small air bubbles bb that stay at the width increase portion 117_a_1 since the filter 116 cannot be disposed horizontally can be removed, the width increase portion 117_a_1 being provided upstream of the filter 116.

In addition, in the liquid ejecting apparatus 100 according to the present embodiment, the one or more heads 10 serving as the liquid ejecting heads include the head 10_2 serving as a second liquid ejecting head that includes a second filter as the filter 116. A second angle which is an angle formed by a second direction, which is a direction in which the liquid passing through the second filter flows, and the gravity direction is larger than the first angle and is equal to or smaller than 45 degrees. The controller 90 performs the first circulation cleaning process with respect to the head 10_2. The first flow rate in the first circulation cleaning process performed with respect to the head 10_2 is lower than the first flow rate in the first circulation cleaning process performed with respect to the head 10_1.

Therefore, regarding the liquid ejecting apparatus 100, it is possible to set the optimum first flow rate in terms of moving the large air bubble Bu in the head 10.

In addition, in the liquid ejecting apparatus 100 according to the present embodiment, the second flow rate in the first circulation cleaning process performed with respect to the head 10_2 serving as the second liquid ejecting head is higher than the second flow rate in the first circulation cleaning process performed with respect to the head 10_1 serving as the first liquid ejecting head.

Therefore, regarding the liquid ejecting apparatus 100, it is possible to set the optimum first flow rate in terms of discharging the large air bubble Bu from the head 10.

In addition, in the liquid ejecting apparatus 100 according to the present embodiment, the one or more heads 10 include the head 10_3 serving as a third liquid ejecting head that includes a third filter as the filter 116. A third angle which is an angle formed by a third direction, which is a direction in which the liquid passing through the third filter flows, and the gravity direction is substantially 0 degrees. The controller 90 performs the first circulation cleaning process with respect to the third liquid ejecting head. The first flow rate in the first circulation cleaning process performed with respect to the head 10_1 serving as the first liquid ejecting head is lower than the first flow rate in the first circulation cleaning process performed with respect to the head 10_3 serving as the third liquid ejecting head.

Therefore, regarding the liquid ejecting apparatus 100, it is possible to set the optimum first flow rate in terms of moving the large air bubble Bu in the head 10.

In addition, in the liquid ejecting apparatus 100 according to the present embodiment, the second flow rate in the first circulation cleaning process performed with respect to the head 10_1 serving as the first liquid ejecting head is higher than the second flow rate in the first circulation cleaning process performed with respect to the head 10_3 serving as the third liquid ejecting head.

Therefore, regarding the liquid ejecting apparatus 100, it is possible to set the optimum first flow rate in terms of discharging the large air bubble Bu from the head 10.

In addition, in the liquid ejecting apparatus 100 according to the present embodiment, the one or more heads 10 include the head 10_3 serving as a third liquid ejecting head that includes a third filter as the filter 116. A third angle which is an angle formed by a third direction, which is a direction in which the liquid passing through the third filter flows, and the gravity direction is substantially 0°. The controller 90 performs, with respect to the head 10_3, the second circulation cleaning process of performing the second circulation cleaning operation without performing the first circulation cleaning operation.

Therefore, when the small air bubbles bb are relatively less likely to stay in the width increase portion 117_a_1 provided upstream of the filter 116 and the presence of the small air bubbles bb can be allowed because of the shape of the filter 116, the type of ink, or the like, the liquid ejecting apparatus 100 may perform the second circulation cleaning process in which the first circulation cleaning operation is omitted.

In addition, in the liquid ejecting apparatus 100 according to the present embodiment, the one or more heads 10 include the head 10_3 serving as a fourth liquid ejecting head that includes a fourth filter as the filter 116. A fourth angle which is an angle formed by a fourth direction, which is a direction in which the liquid passing through the fourth filter flows, and the gravity direction is larger than 45 degrees. The controller 90 performs, with respect to the head 10_3, the second circulation cleaning process of performing the second circulation cleaning operation without performing the first circulation cleaning operation.

Therefore, regarding the liquid ejecting apparatus 100, it is not necessary to meaninglessly perform the first circulation cleaning operation.

In addition, in the liquid ejecting apparatus 100 according to the present embodiment, the head 10 serving as the liquid ejecting head includes the filter chamber 117 partitioned into the upstream chamber 117A and the downstream chamber 117B by the filter 116. The upstream chamber 117A includes the air bubble chamber 114 temporarily storing air bubbles and the width increase portion 117_a_1 that is disposed between the air bubble chamber 114 and the filter 116 and of which the area is larger than the area of the air bubble chamber 114 as seen in a thickness direction of the filter 116.

Therefore, regarding the liquid ejecting apparatus 100, the small air bubbles bb staying in the width increase portion 117_a_1 can be discharged from the head 10.

In addition, in the liquid ejecting apparatus 100 according to the present embodiment, the maximum dimension d1 of the width increase portion 117*a*1 in the thickness direction is smaller than the difference d2 between the outer circumference OC1 of the air bubble chamber 114 and the outer circumference OC2 of the width increase portion 117*a*1 as seen in the thickness direction.

Therefore, regarding the liquid ejecting apparatus 100, the small air bubbles bb staying in the width increase portion 117*a*1 can be discharged from the head 10.

In addition, a cleaning method for the liquid ejecting head according to the present embodiment is a cleaning method for the head 10_1 serving as a first liquid ejecting head including the filter 116 serving as a first filter provided in the middle of a flow path through which liquid is supplied to the plurality of the nozzles N for ejection of the liquid supplied from the storage portion 93 serving as a first liquid storage portion, the method including performing, with respect to the head 10_1, a first circulation cleaning process in which a first circulation operation of circulating the liquid between the head 10_1 and the storage portion 93 at a first flow rate is performed and then a second circulation operation of circulating the liquid at a second flow rate higher than the first flow rate is performed.

Therefore, regarding the liquid ejecting apparatus 100, the large air bubble Bu and the small air bubbles bb in the head 10_1 are integrated with each other by means of the first circulation operation of circulating the liquid at the first flow rate which is relatively low. Thereafter, regarding the liquid ejecting apparatus 100, a new large air bubble Bu obtained through integration is caused to pass through the first filter by means of the second circulation operation of circulating the liquid at the second flow rate which is relatively high, so that the large air bubble Bu is discharged from the head 10_1. As a result, regarding the liquid ejecting apparatus 100, it is possible to reduce a frequency at which the small air bubbles bb are generated in the width increase portion 117*a*1 provided upstream of the first filter.

2: Modification Examples

Each of the above-described embodiments can be modified in various manners. A specific embodiment of modification will be described below. Any two or more embodiments selected from the following examples can be appropriately combined with each other as long as there is no contradiction.

2-1: First Modification Example

In the first embodiment, the liquid ejecting apparatus 100 includes the three angular sensors 95. However, the liquid ejecting apparatus 100 may include no angular sensor 95. For example, the liquid ejecting apparatus 100 includes a reception section that receives operation information indicating an operation performed by a user. The reception section is, for example, a plurality of buttons. The reception section receives operation information indicating the disposition angles of the head 10_1, the head 10_2, and the head 10_3. The controller 90 specifies the disposition angles of the head 10_1, the head 10_2, and the head 10_3 based on the operation information received by the reception section.

2-2: Second Modification Example

In the above-described embodiments, a case where the head 10 constitutes a line head has been used as an example. However, the disclosure is not limited to such a configuration and a serial type configuration in which the head 10 reciprocates along the X-axis may also be adopted. The liquid ejecting apparatus 100 according to the second modification example includes the head 10_1 in which an angle formed by the nozzle surface FN_1 and the horizontal plane SF is the disposition angle θ1, and the head 10_2 in which an angle formed by the nozzle surface FN_2 and the horizontal plane SF is the disposition angle θ2.

2-3: Third Modification Example

The liquid ejecting apparatus 100 described in each of the above-described embodiments can be adopted for various devices such as a facsimile machine and a copier in addition to a device dedicated to printing. However, the application of the liquid ejecting apparatus of the present disclosure is not limited to printing. For example, a liquid ejecting apparatus that ejects a solution of a coloring material is used as a manufacturing device that forms a color filter of a liquid crystal display device. In addition, a liquid ejecting apparatus that ejects a solution of a conductive material is used as a manufacturing device that forms a wire or an electrode on a wiring substrate.

What is claimed is:

1. A liquid ejecting apparatus comprising:

one or more liquid ejecting heads each including a filter provided in a middle of a flow path through which liquid is supplied to nozzles configured to eject the liquid;

a liquid storage portion storing the liquid to be supplied to the liquid ejecting head;

a circulation mechanism circulating the liquid between the liquid ejecting head and the liquid storage portion; and a controller controlling the circulation mechanism, wherein the one or more liquid ejecting heads include a first liquid ejecting head including a first filter as the filter, and the controller performs, with respect to the first liquid ejecting head, a first circulation cleaning process in which a first circulation operation of circulating the liquid at a first flow rate is performed and then a second circulation operation of circulating the liquid at a second flow rate higher than the first flow rate is performed.

2. The liquid ejecting apparatus according to claim 1, wherein the first flow rate is a flow rate at which an air bubble of which a size is equal to or greater than a predetermined size does not pass through the filter, and the second flow rate is a flow rate at which an air bubble of which a size is equal to or greater than the predetermined size passes through the filter.

3. The liquid ejecting apparatus according to claim 1, wherein the first flow rate is higher than a maximum flow rate of the liquid passing through the filter during printing performed by the liquid ejecting head.

4. The liquid ejecting apparatus according to claim 1, wherein the controller stops, in the first circulation cleaning process, circulation of the liquid, which is performed by the circulation mechanism, for a predetermined time after the second circulation operation is performed.

5. The liquid ejecting apparatus according to claim 1, wherein a first direction, which is a direction in which the liquid passing through the first filter flows, and a gravity direction intersect each other.

6. The liquid ejecting apparatus according to claim 5, wherein a first angle, which is an angle formed by the first direction and the gravity direction, is equal to or smaller than 45 degrees.

7. The liquid ejecting apparatus according to claim 6, wherein the first angle is equal to or larger than 5 degrees.

8. The liquid ejecting apparatus according to claim 6, wherein the one or more liquid ejecting heads include a second liquid ejecting head including a second filter as the filter, a second angle which is an angle formed by a second direction, which is a direction in which the liquid passing through the second filter flows, and the gravity direction is larger than the first angle and is equal to or smaller than 45 degrees, the controller performs the first circulation cleaning process with respect to the second liquid ejecting head, and the first flow rate in the first circulation cleaning process performed with respect to the second liquid ejecting head is lower than the first flow rate in the first circulation cleaning process performed with respect to the first liquid ejecting head.

9. The liquid ejecting apparatus according to claim 8, wherein the second flow rate in the first circulation cleaning process performed with respect to the second liquid ejecting head is higher than the second flow rate in the first circulation cleaning process performed with respect to the first liquid ejecting head.

10. The liquid ejecting apparatus according to claim 6, wherein the one or more liquid ejecting heads include a third liquid ejecting head including a third filter as the filter, a third angle which is an angle formed by a third direction, which is a direction in which the liquid passing through the third filter flows, and the gravity direction is substantially 0 degrees, the controller performs the first circulation cleaning process with respect to the third liquid ejecting head, and the first flow rate in the first circulation cleaning process performed with respect to the first liquid ejecting head is lower than the first flow rate in the first circulation cleaning process performed with respect to the third liquid ejecting head.

11. The liquid ejecting apparatus according to claim 10, wherein the second flow rate in the first circulation cleaning process performed with respect to the first liquid ejecting head is higher than the second flow rate in the first circulation cleaning process performed with respect to the third liquid ejecting head.

12. The liquid ejecting apparatus according to claim 6, wherein the one or more liquid ejecting heads include a third liquid ejecting head including a third filter as the filter, a third angle which is an angle formed by a third direction, which is a direction in which the liquid passing through the third filter flows, and the gravity direction is substantially 0 degrees, and the controller performs, with respect to the third liquid ejecting head, a second circulation cleaning process of performing the second circulation operation without performing the first circulation operation.

13. The liquid ejecting apparatus according to claim 6, wherein the one or more liquid ejecting heads include a fourth liquid ejecting head including a fourth filter as the filter, a fourth angle which is an angle formed by a fourth direction, which is a direction in which the liquid passing through the fourth filter flows, and the gravity direction is larger than 45 degrees, and the controller performs, with respect to the fourth liquid ejecting head, a second circulation cleaning process of performing the second circulation operation without performing the first circulation operation.

14. The liquid ejecting apparatus according to claim 1, wherein the liquid ejecting head includes a filter chamber partitioned into an upstream chamber and a downstream chamber by the filter, and the upstream chamber includes an air bubble chamber temporarily storing air bubbles and a width increase portion that is disposed between the air bubble chamber and the filter and of which an area is larger than an area of the air bubble chamber as seen in a thickness direction of the filter.

15. The liquid ejecting apparatus according to claim 14, wherein a maximum dimension of the width increase portion in the thickness direction is smaller than a difference between an outer circumference of the air bubble chamber and an outer circumference of the width increase portion as seen in the thickness direction.

16. A cleaning method for a first liquid ejecting head including a first filter provided in a middle of a flow path through which liquid is supplied to nozzles configured to eject the liquid supplied from a first liquid storage portion, the method comprising:

performing, with respect to the first liquid ejecting head, a first circulation cleaning process in which a first circulation operation of circulating the liquid between the first liquid ejecting head and the first liquid storage portion at a first flow rate is performed and then a second circulation operation of circulating the liquid at a second flow rate higher than the first flow rate is performed.

* * * * *